(12) United States Patent
Asai et al.

(10) Patent No.: US 12,322,416 B2
(45) Date of Patent: Jun. 3, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Satoshi Asai, Tokyo (JP); Jiro Kawano, Tokyo (JP); Shoji Watanabe, Tokyo (JP); Taku Sugawara, Tokyo (JP); Hironori Hattori, Tokyo (JP); Suguru Yokoyama, Tokyo (JP)

(73) Assignee: Sony Group Corporation, Tokyo (JP)

( * ) Notice: Subject to any disclaimer, the term of this patent is extended or adjusted under 35 U.S.C. 154(b) by 283 days.

(21) Appl. No.: 17/617,144

(22) PCT Filed: Jul. 17, 2020

(86) PCT No.: PCT/JP2020/027791
§ 371 (c)(1),
(2) Date: Dec. 7, 2021

(87) PCT Pub. No.: WO2021/020160
PCT Pub. Date: Feb. 4, 2021

(65) Prior Publication Data
US 2022/0165307 A1    May 26, 2022

(30) Foreign Application Priority Data
Jul. 31, 2019 (JP) .................. 2019-141194

(51) Int. Cl.
*G11B 27/036* (2006.01)
*G06T 7/20* (2017.01)
(Continued)

(52) U.S. Cl.
CPC .............. *G11B 27/036* (2013.01); *G06T 7/20* (2013.01); *G06T 13/00* (2013.01); *G06V 20/46* (2022.01);
(Continued)

(58) Field of Classification Search
CPC ........ G11B 27/036; G06V 20/46; G06T 7/20; G06T 13/00; G06T 2207/10016; G06T 2207/30221; G06T 2207/30241
See application file for complete search history.

(56) References Cited

U.S. PATENT DOCUMENTS

| | | | | |
|---|---|---|---|---|
| 6,901,110 | B1 * | 5/2005 | Tsougarakis | ........... H04N 19/17 |
| | | | | 375/240 |
| 2007/0064975 | A1 * | 3/2007 | Takanohashi | ........... G06T 7/292 |
| | | | | 382/103 |

(Continued)

FOREIGN PATENT DOCUMENTS

| | | |
|---|---|---|
| CN | 114144815 A | 3/2022 |
| EP | 2 919 459 A1 | 9/2015 |

(Continued)

OTHER PUBLICATIONS

International Search Report issued on Nov. 2, 2020 in PCT/JP2020/027791 filed on Jul. 17, 2020.

(Continued)

*Primary Examiner* — Thai Q Tran
*Assistant Examiner* — Jose M Mesa
(74) *Attorney, Agent, or Firm* — Oblon, McClelland, Maier & Neustadt, L.L.P.

(57) ABSTRACT

There is provided an information processing apparatus including an image processing section that generates visual information that is to be superimposed on or around a ball in a play video being a video of table-tennis play and that indicates a characteristic of the ball including at least one of a spin speed or a rotation direction of the ball.

20 Claims, 24 Drawing Sheets

(51) Int. Cl.
*G06T 13/00* (2011.01)
*G06V 20/40* (2022.01)

(52) U.S. Cl.
CPC ............ *G06T 2207/10016* (2013.01); *G06T 2207/30221* (2013.01); *G06T 2207/30241* (2013.01)

(56) References Cited

U.S. PATENT DOCUMENTS

| | | | |
|---|---|---|---|
| 2007/0091084 A1* | 4/2007 | Ueshima | A63F 13/573 345/419 |
| 2008/0200287 A1 | 8/2008 | Marty et al. | |
| 2014/0300745 A1* | 10/2014 | Kirk | G06T 7/60 348/158 |
| 2014/0301601 A1 | 10/2014 | Marty | |
| 2015/0241979 A1* | 8/2015 | Nakanishi | H04N 21/84 345/156 |
| 2015/0248917 A1 | 9/2015 | Chang | |
| 2015/0328516 A1* | 11/2015 | Coza | A63B 71/0619 700/91 |
| 2015/0379351 A1 | 12/2015 | Dibenedetto | |
| 2015/0382076 A1 | 12/2015 | Davisson | |
| 2017/0083758 A1 | 3/2017 | Yadav | |
| 2017/0105029 A1* | 4/2017 | Kunigita | H04N 21/44204 |
| 2017/0239521 A1 | 8/2017 | Packard | |
| 2018/0188819 A1 | 7/2018 | Nakanishi et al. | |
| 2018/0314341 A1 | 11/2018 | Nakanishi et al. | |
| 2021/0264141 A1* | 8/2021 | Chojnacki | G06T 7/292 |
| 2022/0165307 A1 | 5/2022 | Asai | |

FOREIGN PATENT DOCUMENTS

| | | |
|---|---|---|
| JP | 2006130289 A | 5/2006 |
| JP | 2007115236 A | 5/2007 |
| JP | 2007226761 A | 9/2007 |
| JP | 2008073209 A | 4/2008 |
| JP | 2010130084 A | 6/2010 |
| JP | 2013240506 A | 12/2013 |
| JP | 2016010714 A | 1/2016 |
| JP | 2016220904 A | 12/2016 |
| JP | 2017131684 A | 8/2017 |
| JP | 2018137671 A | 8/2018 |
| JP | 2019-92006 A | 6/2019 |
| KR | 101921640 B1 | 11/2018 |
| WO | WO-2015098251 A | 7/2015 |
| WO | WO-2021020160 A1 | 2/2021 |

OTHER PUBLICATIONS

Tebbe, J. et al., "Spin Detection in Robotic Table Tennis," arxiv.org, Cornell University Library, arXiv:1905.07967v2 [cs.CV], 2019, XP081499961.

* cited by examiner

INFORMATION PROCESSING APPARATUS, INFORMATION PROCESSING METHOD, AND PROGRAM

TECHNICAL FIELD

The present technology relates to an information processing apparatus, an information processing method, and a program, and more particularly, to an information processing apparatus, an information processing method, and a program that communicate the contents of table-tennis play in an easily understandable manner.

CROSS REFERENCE TO RELATED APPLICATION

This application claims the benefit of Japanese Priority Patent Application JP 2019-141194 filed Jul. 31, 2019, the entire contents of which are incorporated herein by reference.

BACKGROUND ART

In the past, a technique has been proposed in which differences in appearance of play images of a plurality of sports players can be reduced and the images can be easily compared (for example, refer to PTL 1).

CITATION LIST

Patent Literature

PTL 1: Japanese Patent Laid-Open No. 2019-92006

SUMMARY OF INVENTION

Technical Problem

However, according to PTL 1, table tennis is not particularly examined.

The present technology has been made in view of such a situation, and is desirable to communicate the contents of table-tennis play in an easily understandable manner.

Solution to Problem

An information processing apparatus according to an embodiment of the present technology is provided with an image processing section that generates visual information that is to be superimposed on or around a ball in a play video being a video of table-tennis play and that indicates a characteristic of the ball including at least one of a spin speed or a rotation direction of the ball.

By a method for processing information according to one embodiment of the present technology, an information processing apparatus generates visual information that is to be superimposed on or around a ball in a play video being a video of table tennis play and that indicates a characteristic of the ball including at least one of a spin speed or a rotation direction of the ball.

A program according to one embodiment of the present technology causes a computer to execute processing for generating visual information that is to be superimposed on or around a ball in a play video being a video of table-tennis play and that indicates a characteristic of the ball including at least one of a spin speed or a rotation direction of the ball.

In one embodiment of the present technology, visual information that is to be superimposed on or around a ball in a play video being a video of table tennis play and that indicates a characteristic of the ball including at least one of a spin speed or a rotation direction of the ball is generated.

DESCRIPTION OF EMBODIMENTS

Hereinafter, an embodiment for carrying out the present technology will be described. The description will be made in the following order.
1. Embodiment
2. Modification Example
3. Others

1. Embodiment

An embodiment of the present technology will be described with reference to FIGS. 1 to 27.

<Configuration Example of Information Processing System>

Figure 1:
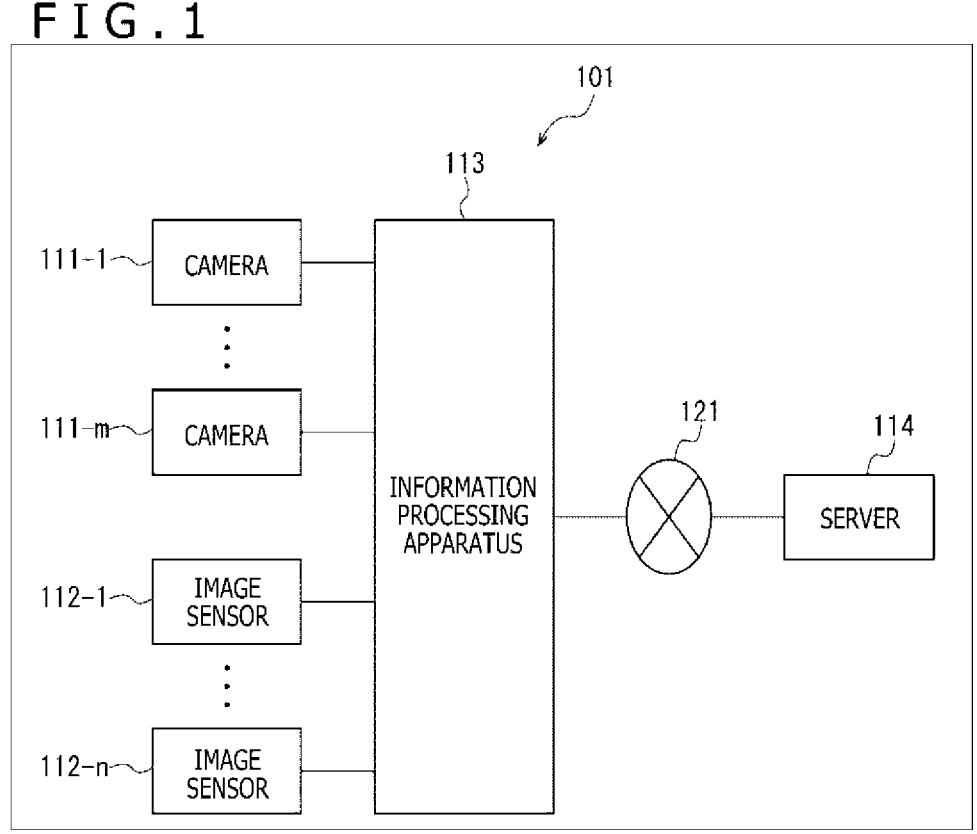
FIG. 1 is a block diagram illustrating a configuration example of an information processing system to which an embodiment of the present technology is applied.

FIG. 1 is a block diagram illustrating an embodiment of an information processing system 101 to which the present technology is applied.

The information processing system 101 performs video image capturing and analysis of a play in a table-tennis match or practice, and editing and distribution of the video of the table-tennis play (hereinafter, referred to as the play video), for example.

The information processing system 101 includes cameras 111-1 to 111-m, image sensors 112-1 to 112-n, an information processing apparatus 113, a server 114, and a network 121. The information processing apparatus 113 and the server 114 are connected to each other via the network 121 including the Internet and can communicate with each other.

The cameras 111-1 to 111-m are configured by cameras for broadcasting, for example. At least some of the cameras 111-1 to 111-m are configured by high-speed cameras capable of high-speed image capturing (for example, 960 fps).

For example, the cameras 111-1 to 111-m capture video images of table-tennis play and supply the obtained play video to the information processing apparatus 113, other broadcasting devices, and the like (not illustrated). The play video is used, for example, for broadcasting a table-tennis game and analyzing the play.

The image sensors 112-1 to 112-n are configured by CMOS (Complementary MOS) image sensors capable of high-speed image capturing (for example, 1000 fps) and high-speed sensing (for example, detection and tracking of an object), for example.

For example, the image sensors 112-1 to 112-n detect and track a table-tennis ball as an object while capturing images of the table-tennis play. In addition, the image sensors 112-1 to 112-n supply the information processing apparatus 113 with obtained images (hereinafter, referred to as sensing images) and information including ball detection and tracking results (hereinafter, referred to as sensing information).

The information processing apparatus 113 is configured by, for example, a device having a video editing function, for example, such as a computer, a video editing device, a broadcasting device. The information processing apparatus 113 analyzes the play of table tennis on the basis of the play video, the sensing image, and the sensing information.

Further, the information processing apparatus 113 edits the play video on the basis of a user instruction, a play analysis result, or the like. The information processing apparatus 113 stores or outputs the play video after editing (hereinafter, referred to as the edited play video), or transmits the video to the server 114 via the network 121.

For example, the server 114 accumulates the edited play video and distributes the edited play video.

Incidentally, hereinafter, the cameras 111-1 to 111-m are simply referred to as cameras 111 in the case where it is not necessary to distinguish these cameras individually. In addition, hereinafter, the image sensors 112-1 to 112-n are simply referred to as image sensors 112 in the case where it is not necessary to distinguish these sensors individually.

<Example of Installation Positions of the Cameras 111 and Image Sensors 112>

Figure 2:
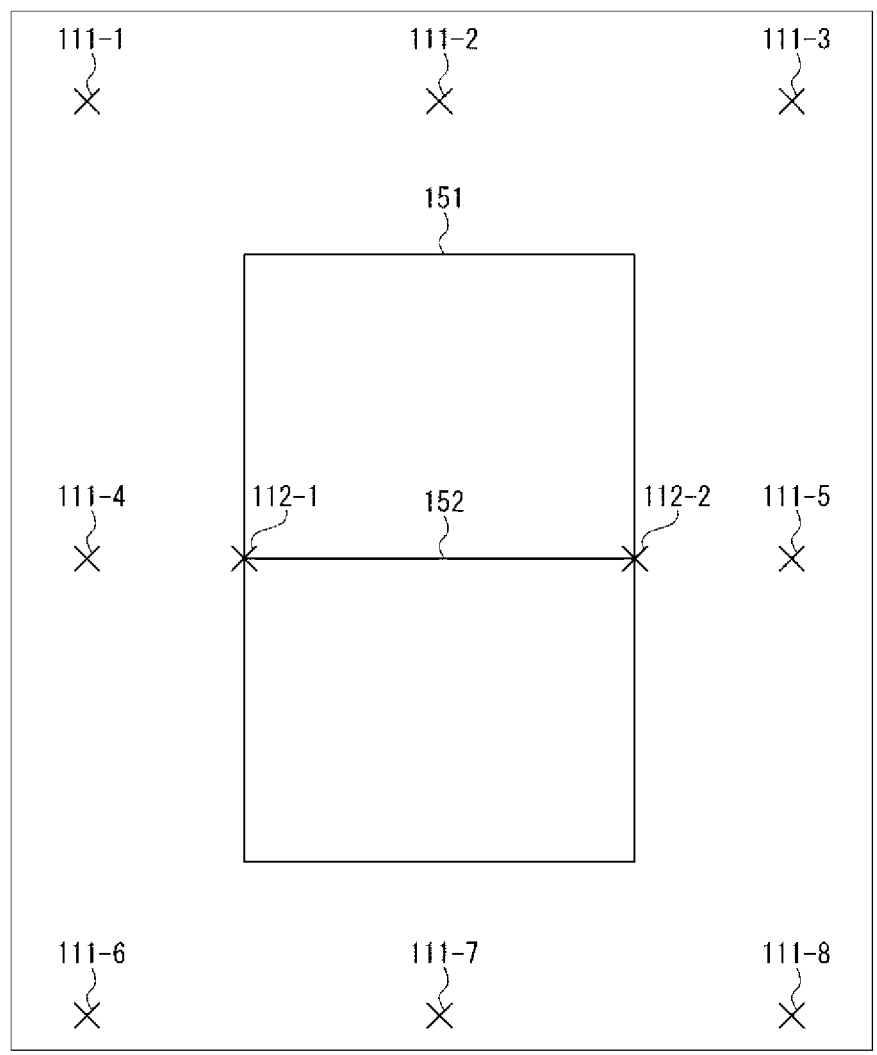
FIG. 2 is a diagram illustrating an example of installation positions of cameras and image sensors.

FIG. 2 illustrates an example of installation positions of the cameras 111 and the image sensors 112.

For example, the cameras 111 are installed at positions necessary for relay broadcasting of a table-tennis match or analyzing the play. In this example, the cameras 111-1 to 111-8 are installed so as to surround a table-tennis table 151 and to be able to capture images while facing toward the table-tennis table 151.

For example, the image sensors 112 are installed at positions where a table-tennis ball during the play can be tracked at all times. In this example, the image sensors 112-1 and 112-2 are installed near the base or top of the support (not illustrated) for setting a net 152 on the table-tennis table 151 so as to capable of capturing images of the court of the table-tennis table 151 and the player.

Note that the numbers and installation positions of the cameras 111 and the image sensors 112 in FIG. 2 are examples thereof, and can be freely changed. For example, the cameras 111 and the image sensors 112 may be installed above the table-tennis table 151 so that the image of the table-tennis table 151 overlooked from above can be captured. However, the cameras 111 and the image sensors 112 may be required to be installed at positions where the cameras and sensors do not hinder the player's play.

<Configuration Example of the Information Processing Apparatus 113>

Figure 3:
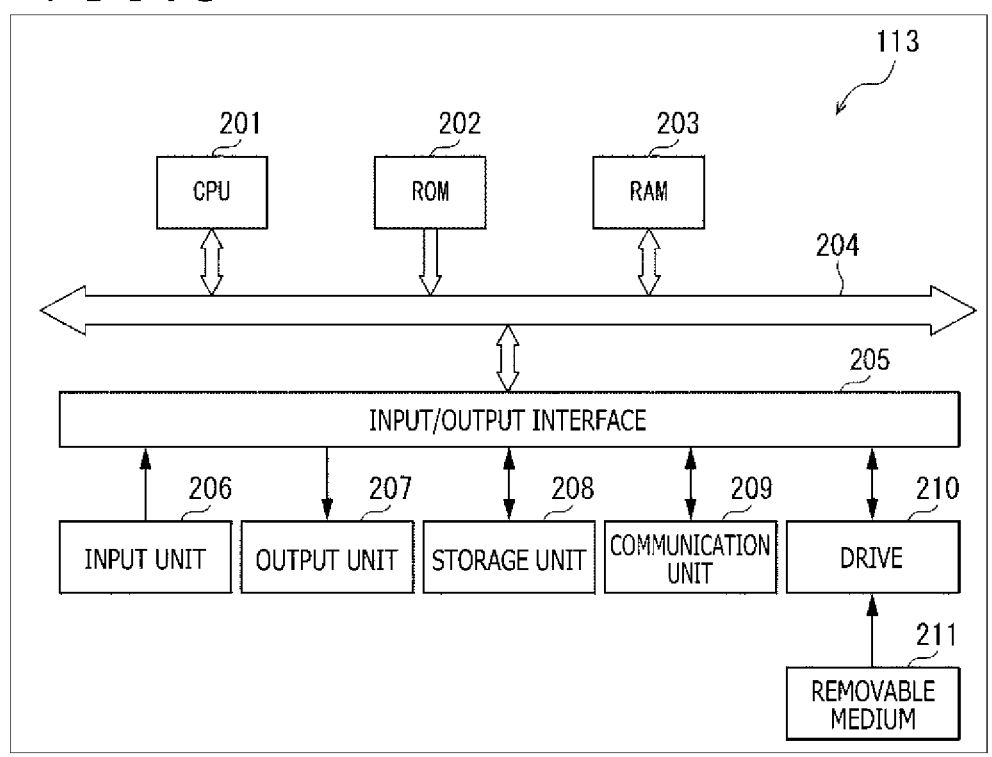
FIG. 3 is a block diagram illustrating a configuration example of an information processing apparatus.

FIG. 3 is a block diagram illustrating a configuration example of the information processing apparatus 113.

The information processing apparatus 113 includes a CPU (Central Processing Unit) 201, a ROM (Read Only Memory) 202, a RAM (Random Access Memory) 203, a bus 204, an input/output interface 205, an input unit 206, an output unit 207, a storage unit 208, a communication unit 209, a drive 210, and a removable medium 211.

The CPU 201, the ROM 202, and the RAM 203 are connected to one another via the bus 204.

Further, the input/output interface 205 is connected to the bus 204. The input unit 206, the output unit 207, the storage unit 208, the communication unit 209, and the drive 210 are connected to the input/output interface 205.

The input unit 206 includes a keyboard, a mouse, a microphone, and the like.

The output unit 207 includes a display, a speaker, and the like.

The storage unit 208 includes a hard disk, a nonvolatile memory, and the like.

The communication unit 209 includes a network interface and the like.

The drive 210 drives the removable medium 211 such as a magnetic disk, an optical disk, a magneto-optical disk, or a semiconductor memory.

In the information processing apparatus 113, the CPU 201 performs a series of processes by, for example, loading a program stored in the storage unit 208 into the RAM 203 via the input/output interface 205 and the bus 204 and executing the program.

In addition, the program executed by the CPU 201 can be provided by being recorded in the removable medium 211 as a package medium, for example. In addition, the program can be provided via a wired or wireless transmission medium such as a local area network, the Internet, or digital satellite broadcasting.

In the information processing apparatus 113, the program can be installed in the storage unit 208 via the input/output interface 205 by attaching the removable medium 211 to the drive 210. In addition, the program can be received by the communication unit 209 via a wired or wireless transmission medium, to be installed in the storage unit 208. Moreover, the program can be installed in advance in the ROM 202 or the storage unit 208.

<Configuration Example of the Information Processing Section 251>

Figure 4:
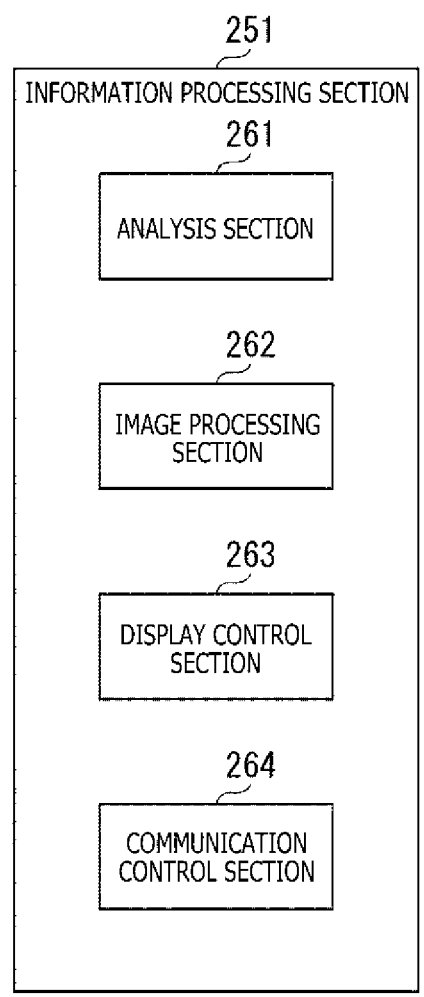
FIG. 4 is a block diagram illustrating a configuration example of an information processing section.

FIG. 4 illustrates a configuration example of an information processing section 251 achieved by the CPU 201 of the information processing apparatus 113 executing a program, for example.

The information processing section 251 includes an analysis section 261, an image processing section 262, a display control section 263, and a communication control section 264.

The analysis section 261 analyzes table-tennis play on the basis of the play video supplied from the cameras 111 and the sensing image and sensing information supplied from the image sensors 112. For example, the analysis section 261 analyzes the characteristics of the ball (for example, the speed, the rotation direction, the spin speed (speed of rotation)), the ball trajectory, the swing trajectory, the position where the ball hits the racket (hereinafter, referred to as a hit point), the ball hitting method, and the position where the ball bounces on the court.

The image processing section 262 performs various types of image processing. For example, the image processing section 262 performs image processing related to editing of the play video. To be specific, for example, the image processing section 262 extracts necessary scenes from the play video images captured by each of the cameras 111, combines these scenes and generates visual information indicating the contents of the play, and then incorporates the information into the play video on the basis of the analysis result of the play by the analysis section 261 or an instruction from the editor or the like. Further, the image processing section 262 outputs the edited play video after editing.

The display control section 263 controls a display or the like included in the output unit 207, and controls display of a play video before editing, an edited play video, a sensing image, and the like.

The communication control section 264 controls communication by the communication unit 209.

<Analysis Editing Process>

Figure 5:
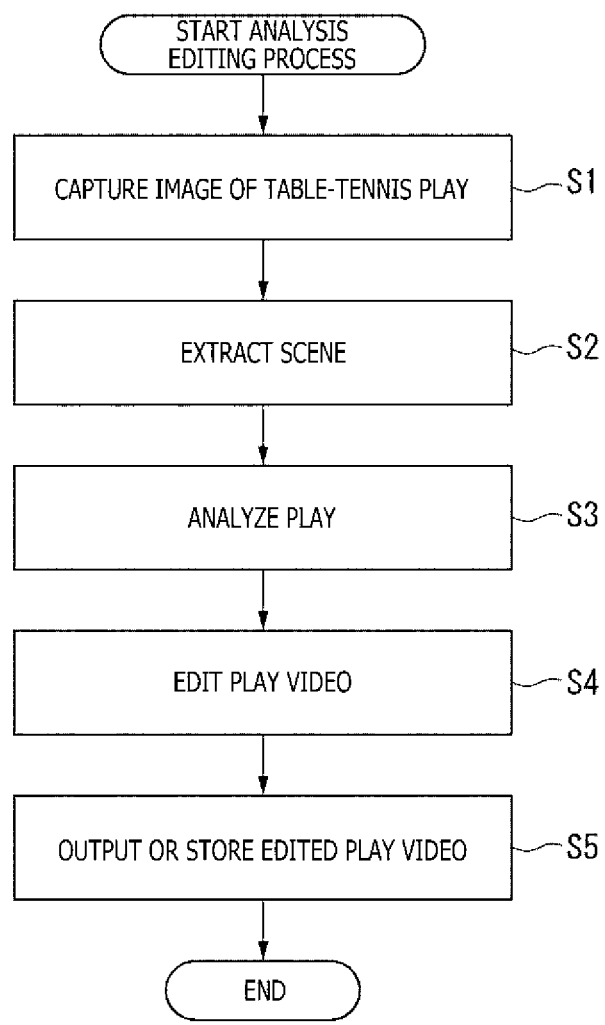
FIG. 5 is a flowchart for explaining an analysis editing process.

Next, an analysis editing process executed by the information processing system 101 will be described with reference to the flowchart of FIG. 5.

In step S1, each of the cameras 111 and each of the image sensors 112 capture images of the play of table tennis.

To be specific, each of the cameras 111 captures video images of table-tennis play and supplies the obtained play video to the information processing apparatus 113.

Each of the image sensors 112 performs image capturing of the table-tennis play in parallel with image capturing by each of the cameras 111, and also detects and tracks the ball. Each of the image sensors 112 supplies the obtained sensing image and sensing information to the information processing apparatus 113.

The information processing apparatus 113 causes the storage unit 208 to store the acquired play video, sensing image, and sensing information, for example.

In step S2, the image processing section 262 performs scene extraction. For example, the image processing section 262 extracts scenes of targets for play analysis or editing from the play video images captured by each of the cameras 111 on the basis of an instruction from the editor or the like input via the input unit 206. For example, important scenes during the match, scenes that the manager, the coach, the player, etc. want to analyze are extracted.

It should be noted that the processing of step S2 may be omitted, and the scene extraction may be performed in step S4 after all the play video have been analyzed in step S3.

In step S3, the analysis section 261 performs analysis of the play.

For example, the analysis section 261 analyzes the rotation direction and the spin speed (speed of rotation) of the ball on the basis of the play video.

Here, an example of a method for analyzing the rotation direction and the spin speed of the ball will be described.

For example, the analysis section 261 estimates the rotation direction and the spin speed of the ball on the basis of the texture of the ball image of each frame, more specifically, on the basis of the movement of the logo in the ball image.

To be specific, the analysis section 261 detects the area in which an image of the ball exists and the center point of the ball from each frame of the play video using the background subtraction method or the like. The analysis section 261 extracts the image of the area in which the image of the ball exists (hereinafter, referred to as a ball image) with the detected center point of the ball as the center of the image from each frame of the play video. The analysis section 261 adjusts the size of the ball image such that the extracted ball images match each other in the ball size as necessary.

Next, the analysis section 261 binarizes each ball image and detects the center point of the logo on the ball on the basis of the binarized ball image.

Next, the analysis section 261 detects the rotation axis of the ball by connecting the average value of the coordinates of the center point of the ball logo and the center point of the ball in each ball image.

Then, the analysis section 261 calculates the inclination of the rotation axis of the ball in the world coordinate system, for example, on the basis of the rotation axes of the ball respectively detected from the play video images taken from two or more different directions.

Further, the analysis section 261 detects the rotation direction of the ball with respect to the rotation axis on the basis of the movement direction of the center point of the ball logo in the ball image.

Further, the analysis section 261 detects the frame interval between times when the center point of the ball logo appears at substantially the same position in the ball image. The analysis section 261 estimates the time corresponding to the detected frame interval to be the time taken for one revolution of the ball. Then, the analysis section 261 calculates the spin speed of the ball (unit: rpm (rotations per minute)) on the basis of the time taken for the ball to make one revolution.

Note that the above-described analysis method of the rotation direction and the spin speed of the ball is an example, and a different method can be used.

Further, for example, the analysis section 261 detects a swing (racket) trajectory and a position where the ball hits the racket (hit point) by tracking the ball and the racket in the play video.

Further, the analysis section 261 detects the trajectory (course or ball route) of the ball during the play on the basis of the sensing image and the sensing information.

Incidentally, for example, it is also possible to detect a ball route by tracing the position of the ball in each frame of the play video images captured by the cameras 111.

However, the image sensors 112 have a higher frame rate than the cameras 111. In addition, since each of the cameras 111 captures a broadcast play image in cooperation with the other cameras 111, the ball may be invisible and the ball route may be lost depending on the position of the player or the ball. On the other hand, as described above, the image sensors 112 are installed at positions where the ball during the play can be tracked at all times, and therefore, the image sensors 112 do not lose the ball route unless an unexpected play occurs.

Therefore, using the sensing image and the sensing information makes it possible to detect the ball route in more detail and more accurately.

Further, the analysis section 261 detects the position where the ball bounces on the court on the basis of the detected ball trajectory.

Further, the analysis section 261 detects the speed of the ball during the play (ball speed) on the basis of the sensing image and the sensing information. For example, the analysis section 261 calculates the ball speed on the basis of the moving distance of the ball between sensing images of different frames and the time between the frames.

Further, the analysis section 261 detects a hitting method of the player in each play on the basis of the detected swing trajectory, the hit point, the ball rotation direction, the spin speed, the speed, the trajectory and the like. Here, the types of hitting methods are classified into a serve, a drive, a cut, a push, a smash, and a lob, for example. Further, each hitting method may be further classified (for example, by classifying the serves according to type) and detected.

In step S4, the image processing section 262 edits the play video.

For example, the image processing section 262 generates visual information that visually indicates the contents of the play. The contents of the play include play analysis results, score progress, and information regarding players, for example.

Note that the image processing section 262 may generate visual information automatically, or may generate the visual information on the basis of an instruction from an editor or the like input via the input unit 206.

Then, the image processing section 262 superimposes the visual information on each frame of the play video as necessary. Note that an example of the visual information will be described later.

In addition, for example, the image processing section 262 extracts main scenes from the play video and joins the main scenes as necessary. For example, this operation may be automatically performed by the image processing section 262 regardless of an instruction from the editor or the like, or may be performed on the basis of an instruction from the editor or the like input via the input unit 206.

In the former case, note that the image processing section 262 extracts an important scene, or a necessary scene, for example, on the basis of a play analysis result or the like. A scene that influences the outcome of the game, a scene in which the maximum ball speed or spin speed is detected, a scene in which the longest rally lasts, and a scene in which the cheer of the audience becomes maximum, for example, are extracted.

In step S5, the information processing apparatus 113 outputs or stores the edited play video.

For example, the storage unit 208 is caused to store the edited play video.

For example, the communication unit 209 transmits the edited play video to the server 141 via the network under the control of the communication control section 264.

On the other hand, the server 141 accumulates the edited play video and distributes the video using a video delivery service, for example.

For example, the information processing apparatus 113 outputs the edited play video to a subsequent broadcasting device (not illustrated). Then, the edited play video is broadcasted, for example, between games during a match, between matches, after matches end, and the like during relay broadcasting of matches of table tennis. Further, for example, the edited play video is broadcasted in programs other than the table-tennis relay broadcasting (for example, sports news).

<Example of Visual Information>

Next, an example of visual information superimposed on a play video will be described with reference to FIGS. 6 to 27.

First, examples of the play video on which visual information is superimposed will be described with reference to FIGS. 6 to 18.

In FIGS. 6 to 15, 17, and 18, the play video before the visual information is superimposed is indicated by broken lines, and the visual information is indicated by solid lines. The table-tennis table 151, the net 152, a player 301, a racket 302, and a ball 303 are seen in the play video before the visual information is superimposed.

Further, hereinafter, a user who views the play video is referred to as an audience.

<First Example of the Visual-Information-added Video>

Figure 6:
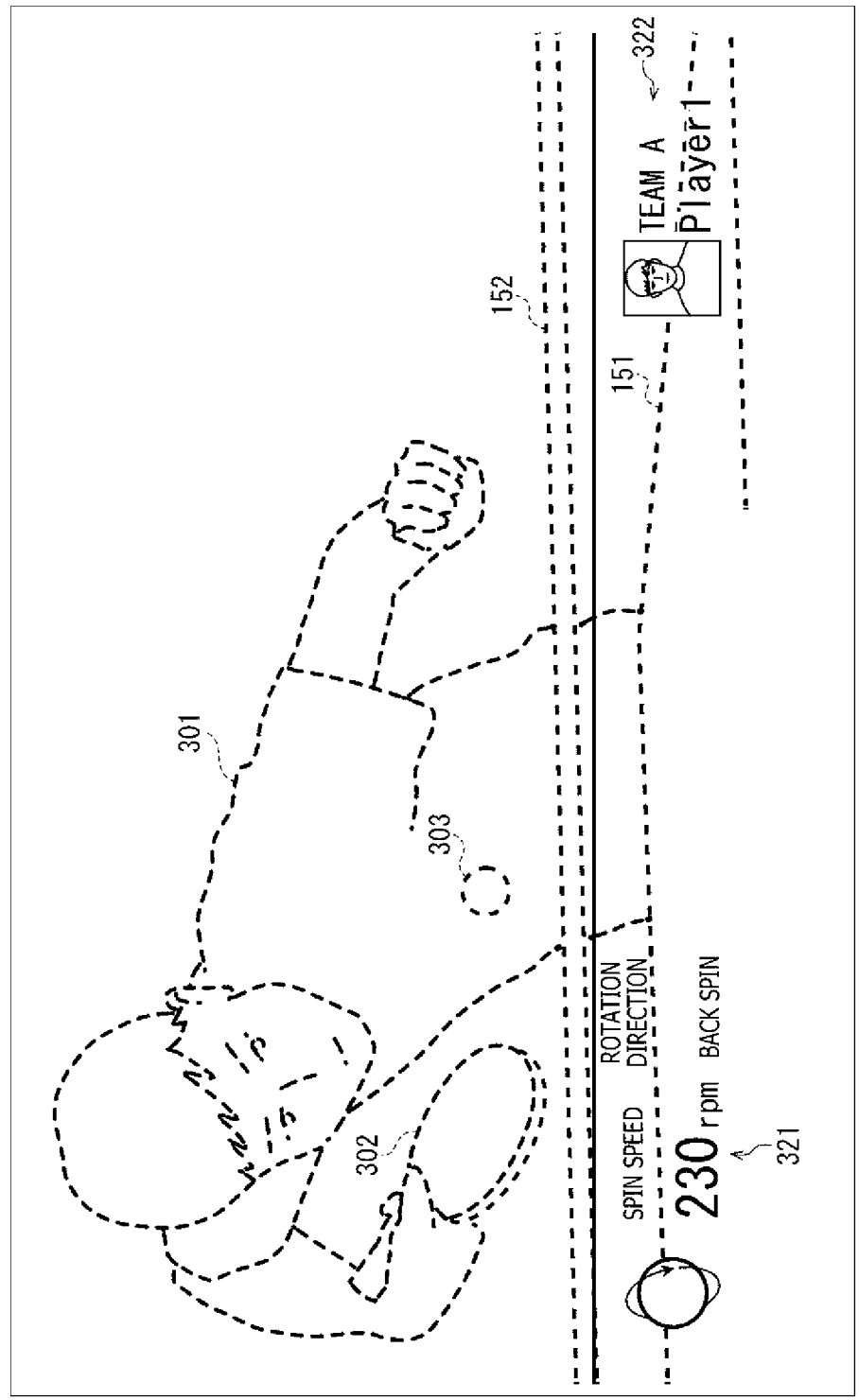
FIG. 6 is a diagram illustrating a first example of visual-information-added video.

FIG. 6 illustrates a first example of the visual-information-added video.

In this example, ball information 321 and player information 322 are superimposed on the play video.

The ball information 321 is superimposed on the lower left of the play video. The ball information 321 includes information regarding the characteristics of the ball 303 (movement of the ball 303). Specifically, in the ball information 321, an image indicating the rotation direction of the ball 303 (hereinafter, referred to as a ball rotation image), the spin speed, and the rotation direction are displayed side by side.

In the ball rotation image, an arrow indicating the rotation direction is represented so as to surround the periphery of the ball image. The audience can thereby intuitively recognize the rotation direction of the ball 303.

Note that, for example, in the ball rotation image, animation display in which the ball or the arrow is rotated in the rotation direction may be performed.

The player information 322 is superimposed on the lower right of the play video. The player information 322 includes information regarding the player 301. Specifically, in the player information 322, an image of the upper body of the player 301 and the profile of the player 301 (the team name and the player name) are displayed side by side.

<Second Example of Visual-Information-Added Video>

Figure 7:
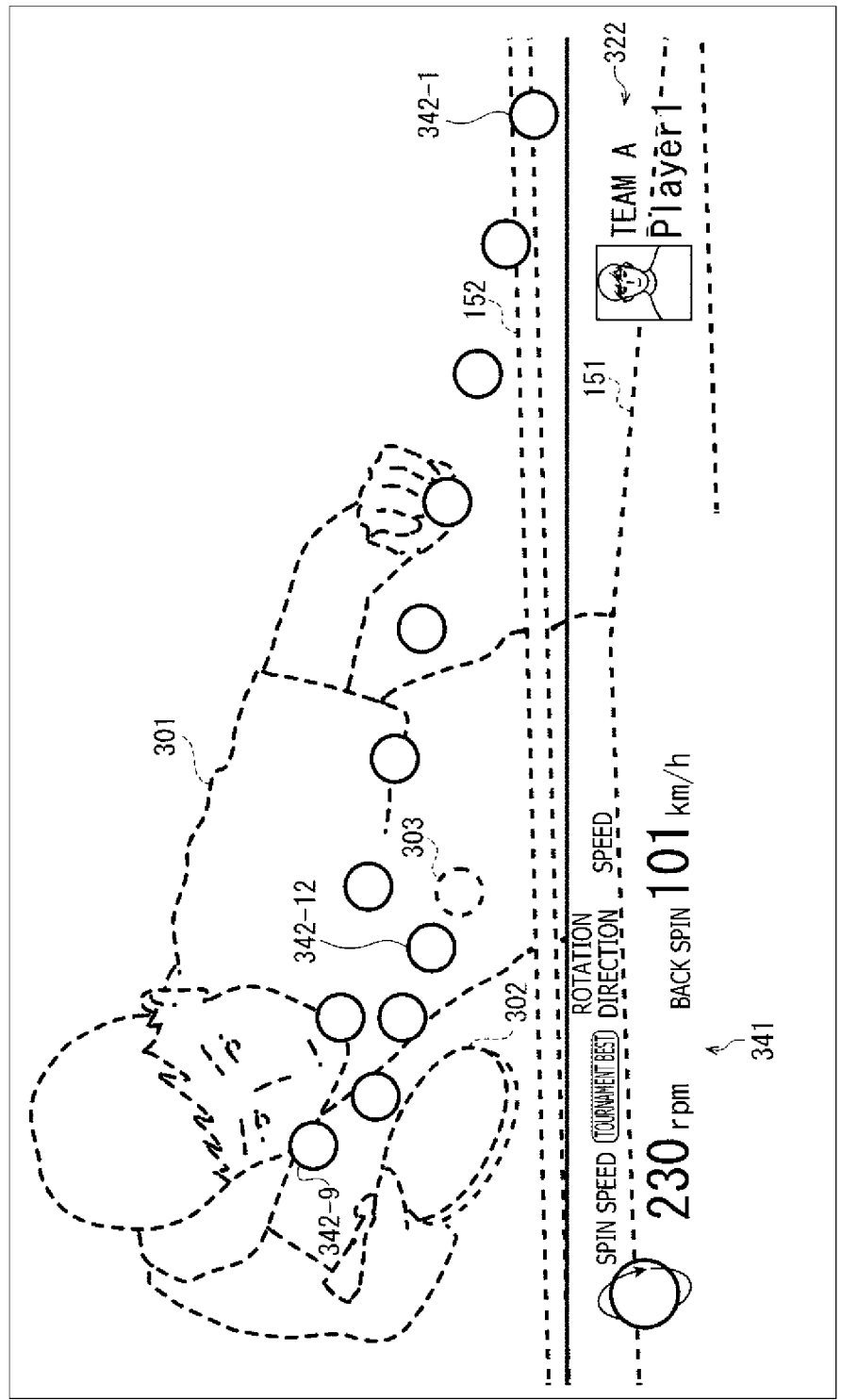
FIG. 7 is a diagram illustrating a second example of visual-information-added video.

FIG. 7 illustrates a second example of the visual-information-added video. Incidentally, in the figure, parts corresponding to those in FIG. 6 are denoted by the same reference numerals, and description thereof will be omitted as appropriate.

The visual-information-added video of FIG. 7 is different from the visual-information-added video of FIG. 6 in that ball information 341 is superimposed on the play video instead of the ball information 321, and balls 342-1 to 342-12 are superimposed on the play video.

Note that, in order to make the figure easier to understand, some reference numerals of the balls 342-1 to 342-12 are omitted. Actually, the balls 342-1 to 342-9 are arranged in order from right to left in the figure, and balls 342-9 to 342-12 are arranged in order from left to right in the figure. This is similarly applied also to FIGS. 8 to 10 to be described later.

The ball information 341 is superimposed on the lower left of the play video. The ball information 341 is different from the ball information 321 in FIG. 6 in that the speed of the ball 303 is added. In addition, it is indicated that the spin speed of the ball 303 is the best record of the tournament.

The balls 342-1 to 342-12 are visual information indicating the trajectory of the ball 303. For example, the balls 342-1 to 342-12 intermittently indicate the positions of the ball 303 in the frames before the play image of FIG. 7, that is, the positions of the ball 303 in the past trajectory of the ball 303.

Incidentally, for example, as the balls 342-1 to 342-12, an actual image of the ball 303 may be used, or an image generated by CG (Computer Graphics) may be used. Here, in the case where an actual image of the ball 303 is used for the balls 342-1 to 342-12, it is desirable to perform image processing such as semi-transparentization so that it can be distinguished from the ball 303 of the play video.

The audience can easily recognize the trajectory of the ball 303 until the ball 303 reaches the current position by means of the balls 342-1 to 342-12.

<Third Example of Visual-Information-Added Video>

Figure 8:
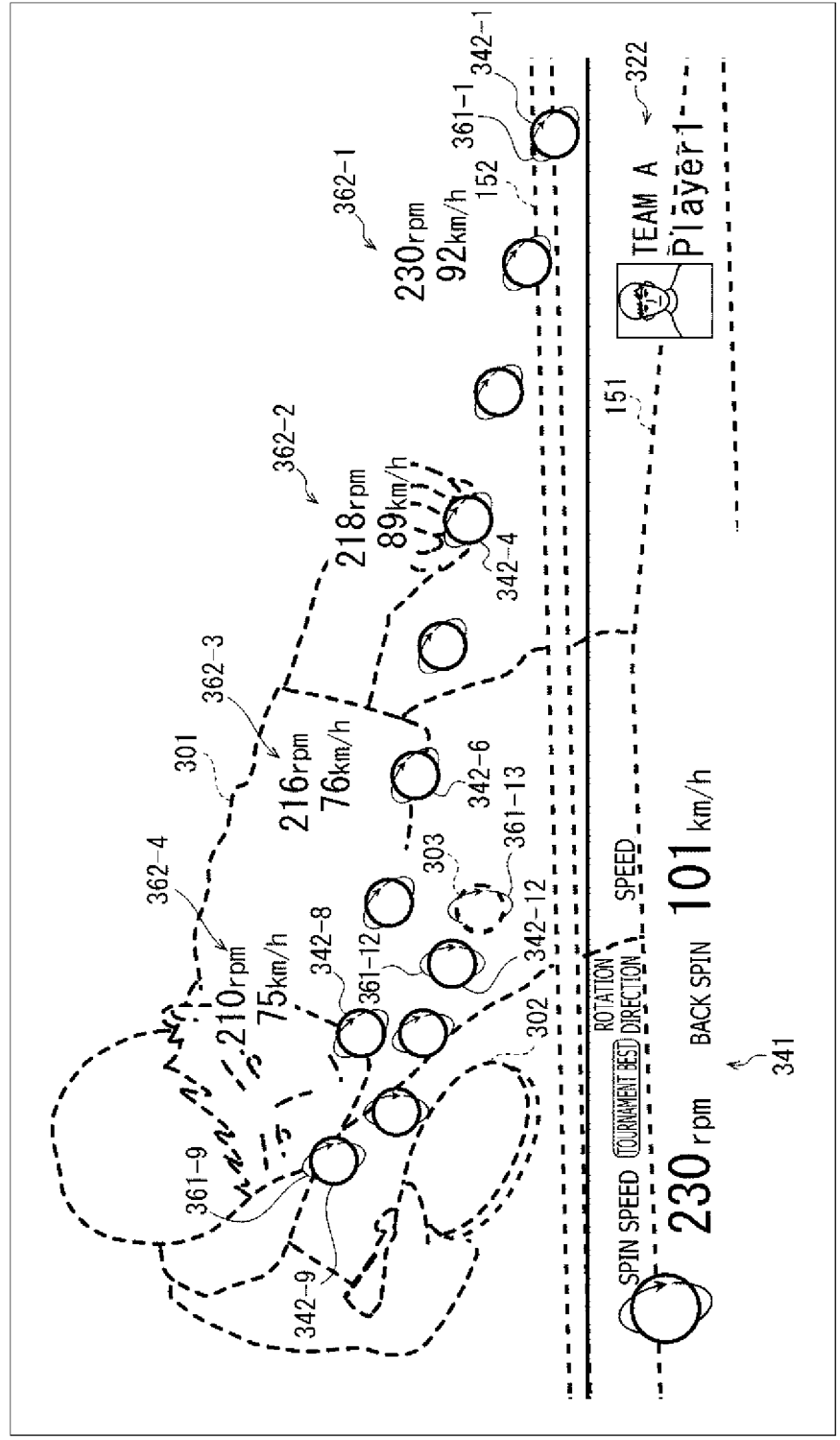
FIG. 8 is a diagram illustrating a third example of visual-information-added video.

FIG. 8 illustrates a third example of the visual-information-added video. Note that parts corresponding to those in FIG. 7 are denoted by the same reference numerals in the figure, and description thereof will be omitted as appropriate.

The visual-information-added video in FIG. 8 is different from the visual-information-added video in FIG. 7 in that arrows 361-1 to 361-13 and ball information 362-1 to 362-4 are superimposed on the play video.

Note that, in order to make the figure easier to understand, some reference numerals of the arrows 361-1 to 361-13 are omitted. Actually, the arrows 361-1 to 361-12 are superimposed on the balls 342-1 to 342-12, and the arrow 361-13 is superimposed on the ball 303. This also applies to FIG. 9 to be illustrated later.

The arrows 361-1 to 361-13 are visual effects indicating the rotation directions of the ball 303 at the displayed positions. That is, the arrows 361-1 to 361-13 are represented so as to surround the balls 342-1 to 342-12 and the ball 303, each pointing in the rotation direction, respectively. The audience can thereby intuitively recognize the time-series change in the rotation direction of the ball 303.

Note that, for example, animation display in which the arrows 361-1 to 361-13 are rotated in the rotation direction may be performed.

Further, for example, the display mode (for example, the color or thickness of the lines) of the arrows 361-1 to 361-13 may be changed depending on the spin speed of the ball 303.

The ball information 362-1 to 362-4 are superimposed above balls 342-2, 342-4, 342-6, and 342-8. The ball information 362-1 to 362-4 include information regarding the characteristics of the ball 303 at the positions indicated by the balls 342-2, 342-4, 342-6, and 342-8, respectively.

Specifically, in the ball information 362-1 to 362-4, the spin speed and the speed of the ball 303 at each position arranged vertically are displayed.

The audience can thereby specifically understand the time-series changes in the spin speed and speed of the ball 303.

<Fourth Example of Visual-Information-Added Video>

Figure 9:
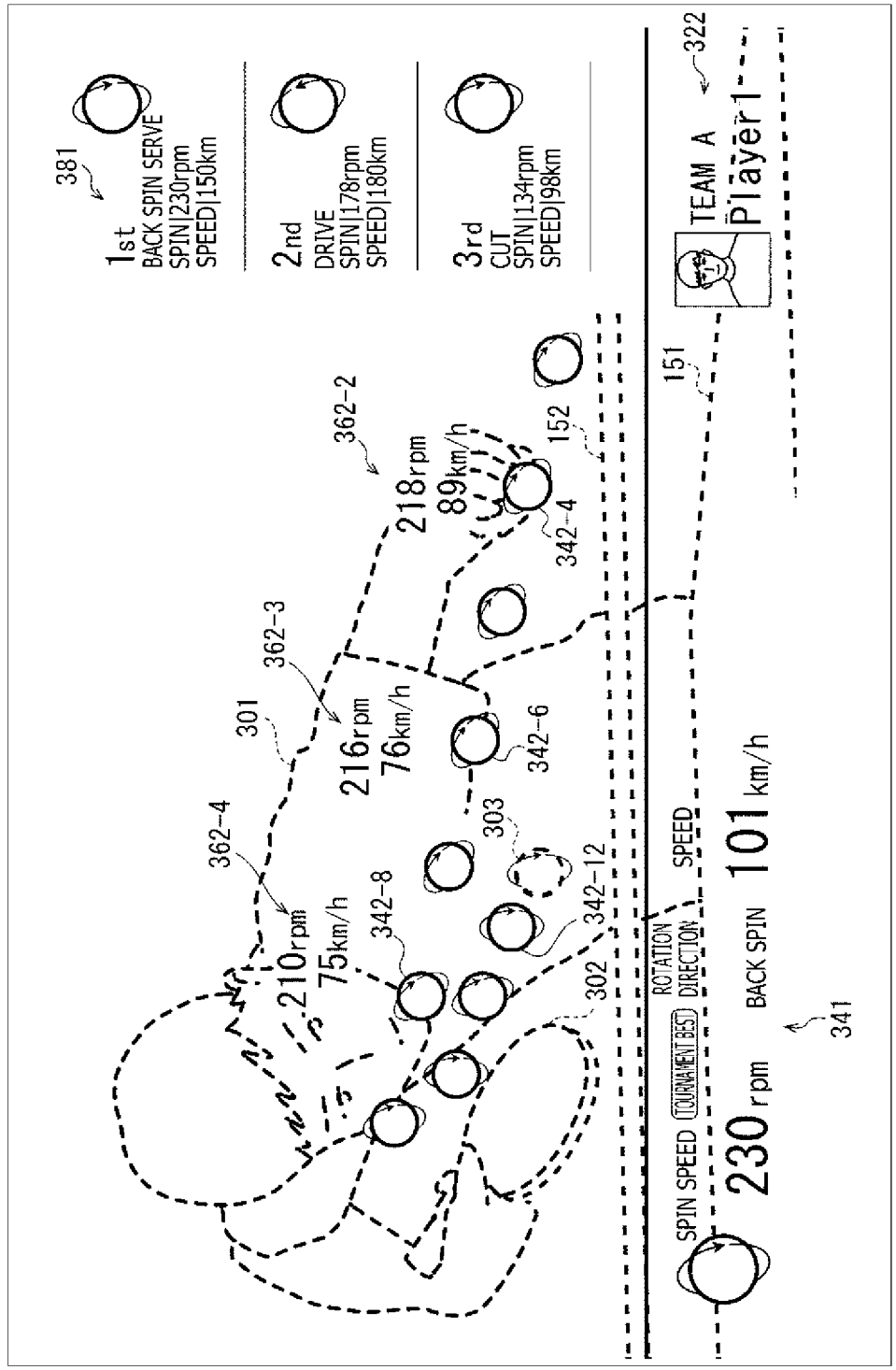
FIG. 9 is a diagram illustrating a fourth example of visual-information-added video.

FIG. 9 illustrates a fourth example of the visual-information-added video. Incidentally, parts corresponding to those in FIG. 8 are denoted by the same reference numerals in the figure, and description thereof will be omitted as appropriate.

The visual-information-added video in FIG. 9 is different from the visual-information-added video in FIG. 8 in that rally information 381 is added.

The rally information 381 is superimposed above the player information 322 at the right end of the play video. Further, by superimposing the rally information 381, a ball 342-1 and an arrow 361-1, a ball 342-2 and an arrow 361-2, and ball information 362-1 displayed in the visual-information-added image of FIG. 8 have disappeared.

The rally information 381 includes information regarding each stroke of the rally. Specifically, in this example, information regarding strokes from the first to third shots of the rally is arranged in order from the top. In addition, the hitting method, the spin speed, the speed, and the ball rotation image are displayed in the information regarding each stroke. The ball rotation image is an image indicating the rotation direction of the ball 303, similarly to the ball rotation image of the ball information 321 in FIG. 6 described above.

Note that, in the case where shots continued four or more times in the rally, for example, information regarding the latest three strokes is displayed in the rally information 381.

Thus, the audience can easily and specifically understand the time-series transition of the rally.

<Fifth Example of Visual-Information-Added Video>

Figure 10:
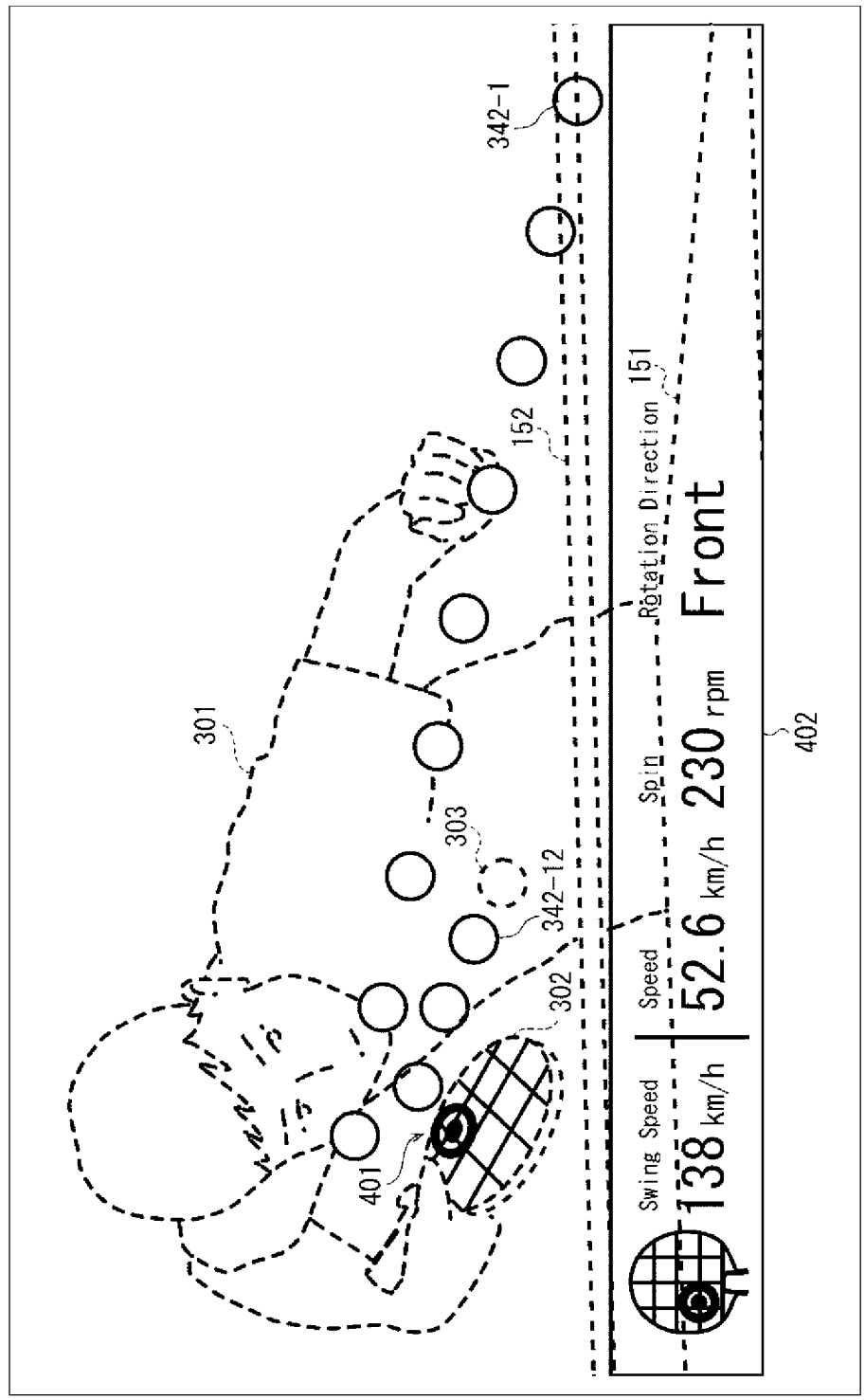
FIG. 10 is a diagram illustrating a fifth example of visual-information-added video.

FIG. 10 illustrates a fifth example of the visual-information-added video. Incidentally, parts corresponding to those in FIG. 7 are denoted by the same reference numerals in the figure, and description thereof will be omitted as appropriate.

The visual-information-added video in FIG. 10 is different from the visual-information-added video in FIG. 7 in that the player information 322 and the ball information 341 are deleted, and hit point information 401 and play information 402 are added.

The hit point information 401 is superimposed on the surface of the racket 302 which hits the ball 303 (hereinafter, referred to as the hit surface) in the play video. Specifically, in the hit point information 401, the hit surface of the racket 302 is divided into 16 areas by auxiliary lines of three longitudinal lines and three lateral lines. Here, the longitudinal direction of the hit surface of the racket 302 is a direction in which the grip of the racket 302 extends, and the lateral direction is a direction perpendicular to the direction in which the grip extends. Further, the position on the hit surface of the racket 302, at which the racket hits the ball 303 (that is, the hit point) is indicated by a black circle and a circle surrounding the black circle.

The play information 402 is superimposed on the lower end of the play video. The play information 402 includes information regarding how to hit the ball 303 and the characteristics of the ball 303.

To be specific, the hit points and the swing speed are displayed side by side as information regarding how to hit the ball 303, in the play information 402. The hit points are indicated on the image imitating the racket 302 by the similar method as the hit point information 401. However, the image imitating the racket 302 is represented such that the hit surface faces the front direction, and therefore the audience can recognize the hit point more easily.

Further, in the play information 402, the ball speed, the spin speed, and the rotation direction are displayed side by side as information relating to the characteristics of the ball 303.

Thus, the audience can understand how the player 301 hits the ball 303 of the current characteristics.

<Sixth Example of Visual-Information-Added Video>

Figure 11:
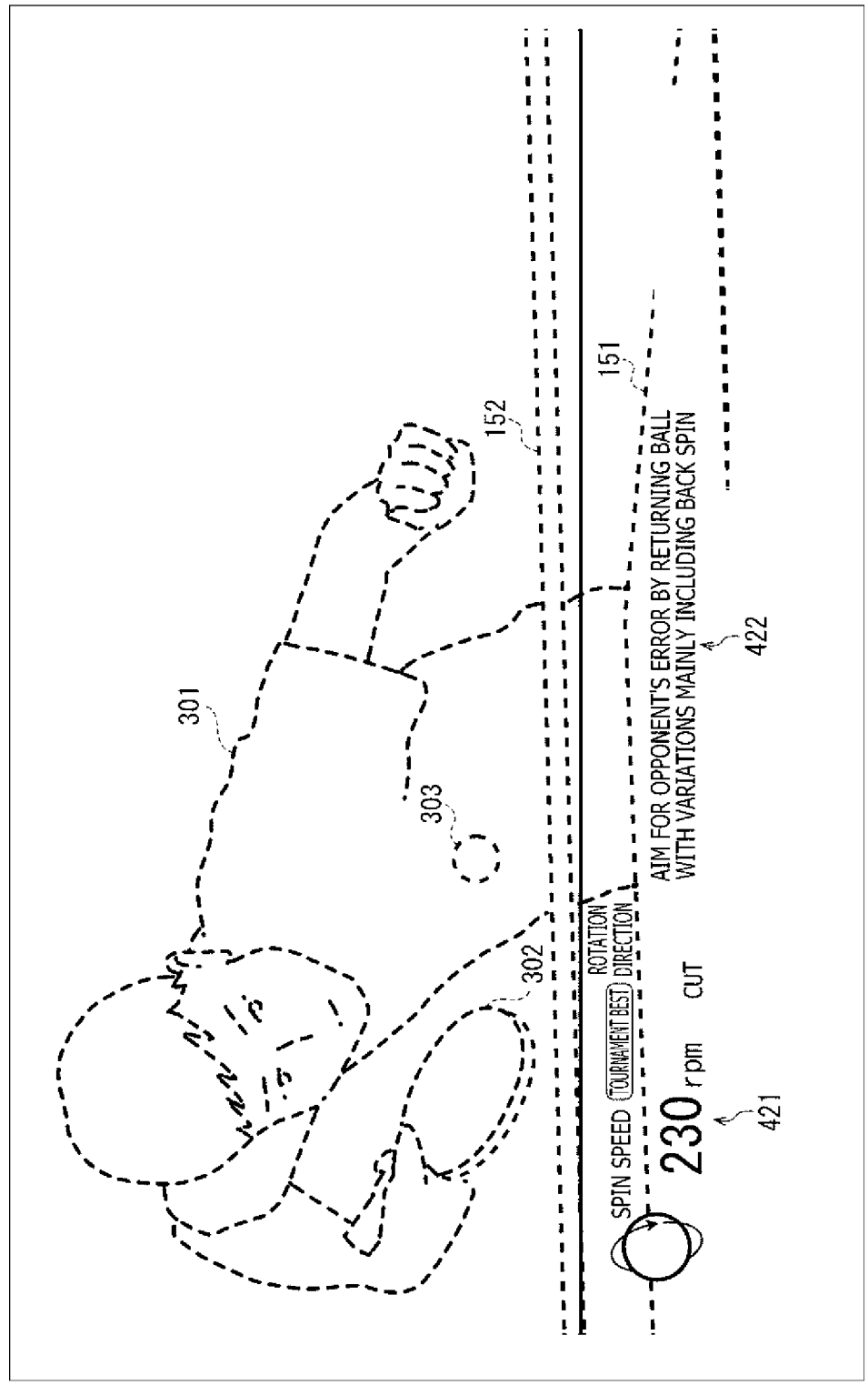
FIG. 11 is a diagram illustrating a sixth example of visual-information-added video.

FIG. 11 illustrates a sixth example of the visual-information-added video.

In this example, ball information 421 and comment information 422 are superimposed on the play video.

The ball information 421 is superimposed on the lower left of the play video. The ball information 421 includes information regarding the characteristics of the ball 303. To be specific, the ball information 421 is different from the ball information 321 in FIG. 6 in that the rotation direction of the ball 303 is indicated by means of the hitting method, and information indicating that the spin speed of the ball 303 is the best record of the tournament is added.

The comment information 422 is superimposed on the right side of the ball information 421 in the play video. The comment information 422 includes comments regarding the play of the player 301 in the play video. For example, the comment information 422 indicates the strategy or intention of play of the player 301.

Incidentally, the comment displayed in the comment information 422 may be input by, for example, an editor, or may be based on information obtained by voice recognition of the commentator's comment content broadcasted together with the play video.

The audience can thereby understand the strategy, the intention of play of the player 301, etc., and the pleasure of watching table tennis increases.

<Seventh Example of Visual-Information-Added Video>

Figure 12:
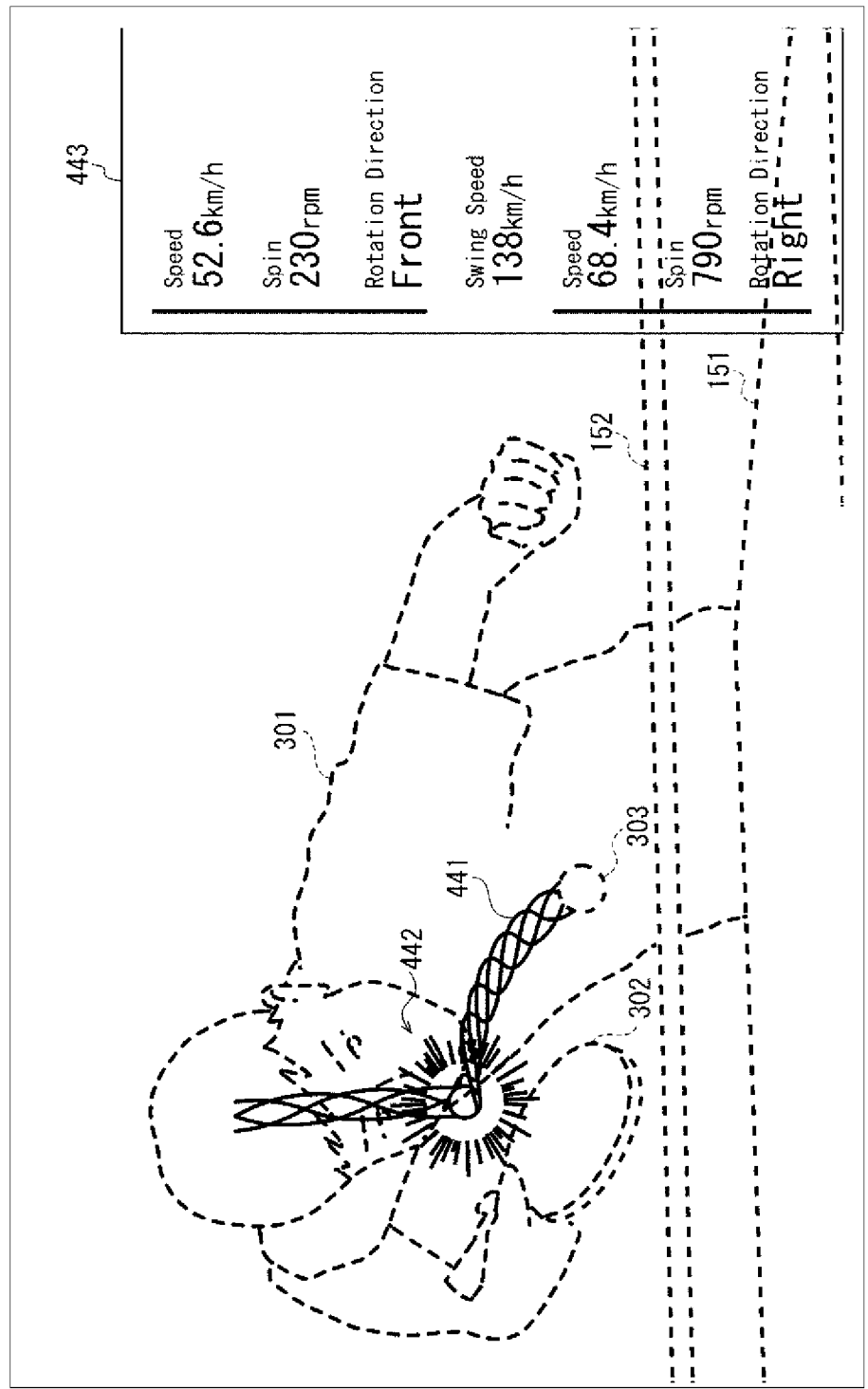
FIG. 12 is a diagram illustrating a seventh example of visual-information-added video.

FIG. 12 illustrates a seventh example of the visual-information-added video.

In this example, a visual effect 441, a visual effect 442, and play information 443 are superimposed on the play video.

The visual effect 441 is visual information indicating the trajectory and the spin speed of the ball 303. For example, the visual effect 441 contains a plurality of corrugated lines drawn by connecting the characteristic points of the ball 303 between the frame in which the ball 303 reached the highest point after the player 301 tossed up the ball 303 to hit the serve and the frame illustrated in FIG. 12. Further, the wavelength of the corrugated line of the visual effect 441 becomes shorter as the speed of rotation (spin speed) becomes faster relative to the speed of the ball 303.

The visual effect 442 is visual information indicating the position of the ball 303 at the moment when the ball 303 hits the racket 302, in other words, the moment of impact.

The play information 443 is superimposed on the right end of the play video. The play information 443 includes information regarding the characteristics of the ball 303 before and after the impact, and the swing speed. To be specific, the play information 443 includes the speed, the spin speed, the rotation direction, the swing speed of the ball 303 before the impact, and the speed, the spin speed, and the rotation direction of the ball 303 after the impact, lined up in a column and displayed.

Thus, the audience can easily recognize the impact position and the change of the movement of the ball 303 before and after the impact.

<Eighth Example of Visual-Information-Added Video>

Figure 13:
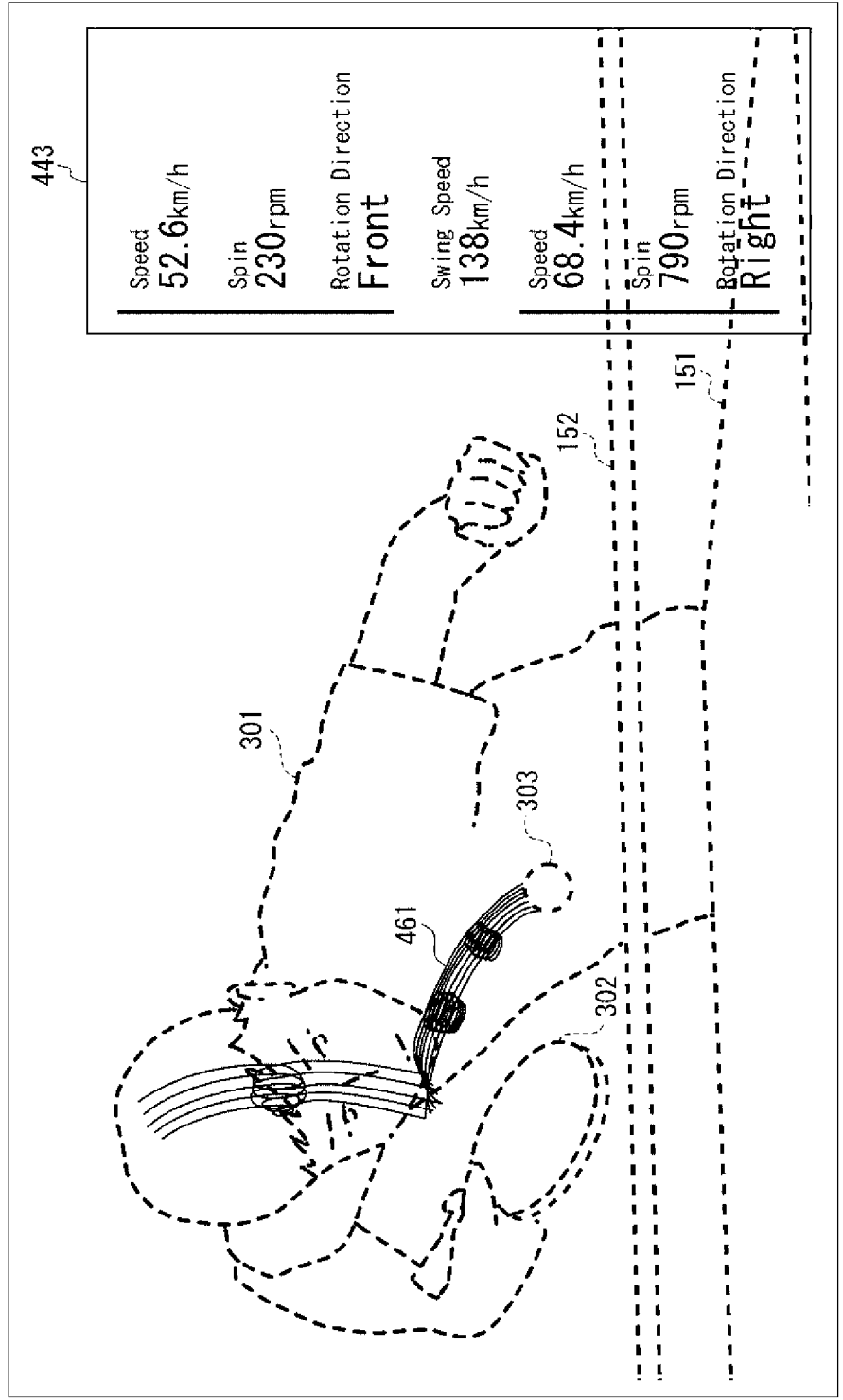
FIG. 13 is a diagram illustrating an eighth example of visual-information-added video.

FIG. 13 illustrates an eighth example of the visual-information-added video. Incidentally, parts corresponding to those in FIG. 12 are denoted by the same reference numerals in the figure and description thereof will be omitted as appropriate.

The eighth visual-information-added video is different from the visual-information-added video in FIG. 12 in that the visual effect 441 and the visual effect 442 are deleted and a visual effect 461 is added.

The visual effect 461 is visual information indicating the trajectory and the rotation direction of the ball 303. For example, the visual effect 461 includes lines indicating the trajectory and the rotation direction of the ball 303 between the frame in which the player 301 tossed up the ball 303 to hit the serve and the ball 303 reached the highest point and the frame illustrated in FIG. 13. The visual effect 461 basically indicates the trajectory of the ball 303, but appropriately indicates the rotation direction of the ball 303 in the middle of the trajectory.

The audience can thereby easily recognize the trajectory and the rotation direction of the ball 303.

<Ninth Example of Visual-Information-Added Video>

Figure 14:
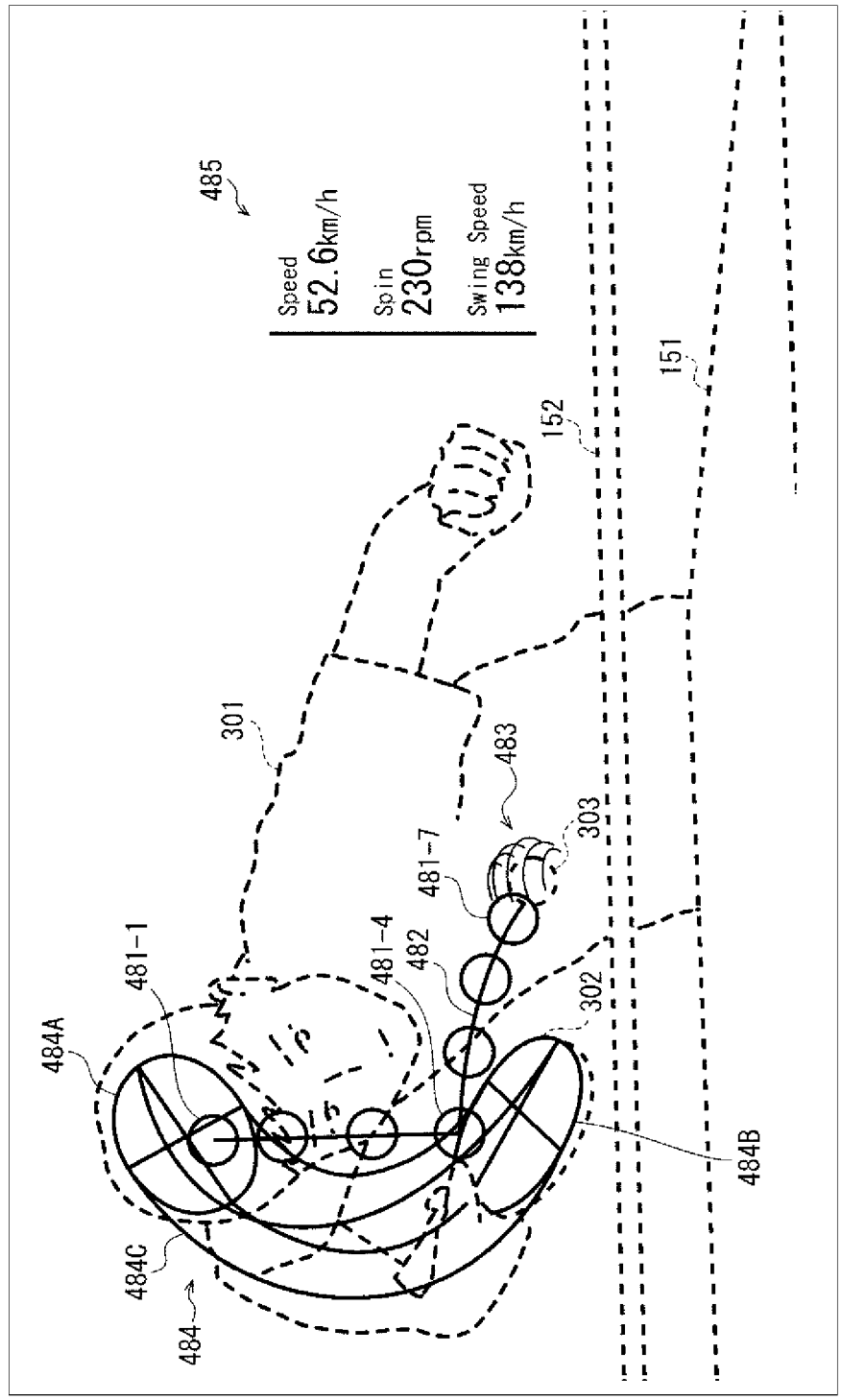
FIG. 14 is a diagram illustrating a ninth example of visual-information-added video.

FIG. 14 illustrates a ninth example of the visual-information-added video.

In this example, balls 481-1 to 481-7, a trajectory 482, a visual effect 483, a visual effect 484, and play information 485 are superimposed on the play video.

In order to make the figure easy to understand, some reference numerals of the balls 481-1 to 481-7 are omitted. In reality, the balls 481-1 to 481-4 are arranged in order from top to bottom in the figure, and the balls 481-4 to 481-7 are arranged in order from left to right in the figure. This similarly applies to FIGS. 15 and 17 to be illustrated later.

The balls 481-1 to 481-7 and a trajectory 482 are visual information indicating the trajectory of the ball 303.

The balls 481-1 to 481-7 are visual information representing the trajectory of the ball 303. For example, the balls 481-1 to 481-7 indicate intermittently the positions of the ball 303 in frames before the play video image in FIG. 14, that is, the positions of the ball 303 in the past trajectory of the ball 303.

It should be noted that, as the balls 481-1 to 481-7, an actual image of the ball 303 may be used, for example, or an image generated by CG may be used. Incidentally, in the case where an image of the actual ball 303 is used for the balls 481-1 to 481-7, image processing such as semitransparent display processing is desirably applied such that the balls can be distinguished from the ball 303 of the play video.

For example, the trajectory 482 is drawn by connecting the characteristic points of the ball 303 in the frames from the past to the present, and the trajectory of the ball 303 is indicated by a line.

The visual effect 483 is visual information indicating the rotation direction of the ball 303. The visual effect 483 indicates the rotation direction of the ball 303 by a plurality of lines.

The visual effect 484 is visual information indicating a swing trajectory. The visual effects 484 include visual effects 484A to 484C.

The visual effect 484A indicates, for example, the position of the hit surface of the racket 302 in the frame of the play video when the player 301 swung up the racket 302 to serve a ball. To be specific, the visual effect 484A includes a line indicating the outer circumference of the hit surface of the racket 302, a line connecting the apexes in the longitudinal direction of the hit surface, and a line connecting the apexes in the lateral direction of the hit surface.

The visual effect 484B indicates, for example, the position of the hit surface of the racket 302 in the play video of FIG. 14. To be specific, the visual effect 484B, similarly to the visual effect 484A, includes a line indicating the outer circumference of the hit surface of the racket 302, a line connecting the apexes in the longitudinal direction of the hit surface, and a line connecting the apexes in the lateral direction of the hit surface.

The visual effect 484C indicates the trajectory of the racket 302 (swing) from the frame of the play video when the racket 302 is swung up to the frame of the play video of FIG. 14. To be specific, the visual effect 484C includes lines indicating trajectories of the four points having the apexes in the longitudinal direction and the apexes in the lateral direction of the racket 302 from the visual effect 484A to the visual effect 484B.

The audience can thereby recognize the movement of the swing of the player 301 clearly.

The play information 485 is superimposed at a position slightly closer to the center with respect to the right end of the play video. The play information 485 includes information regarding the characteristics of the ball 303 and the swing speed. Specifically, in the play information 485, the ball speed, spin speed, and swing speed arranged in the vertical direction are displayed.

<Tenth Example of Visual-Information-Added Video>

Figure 15:
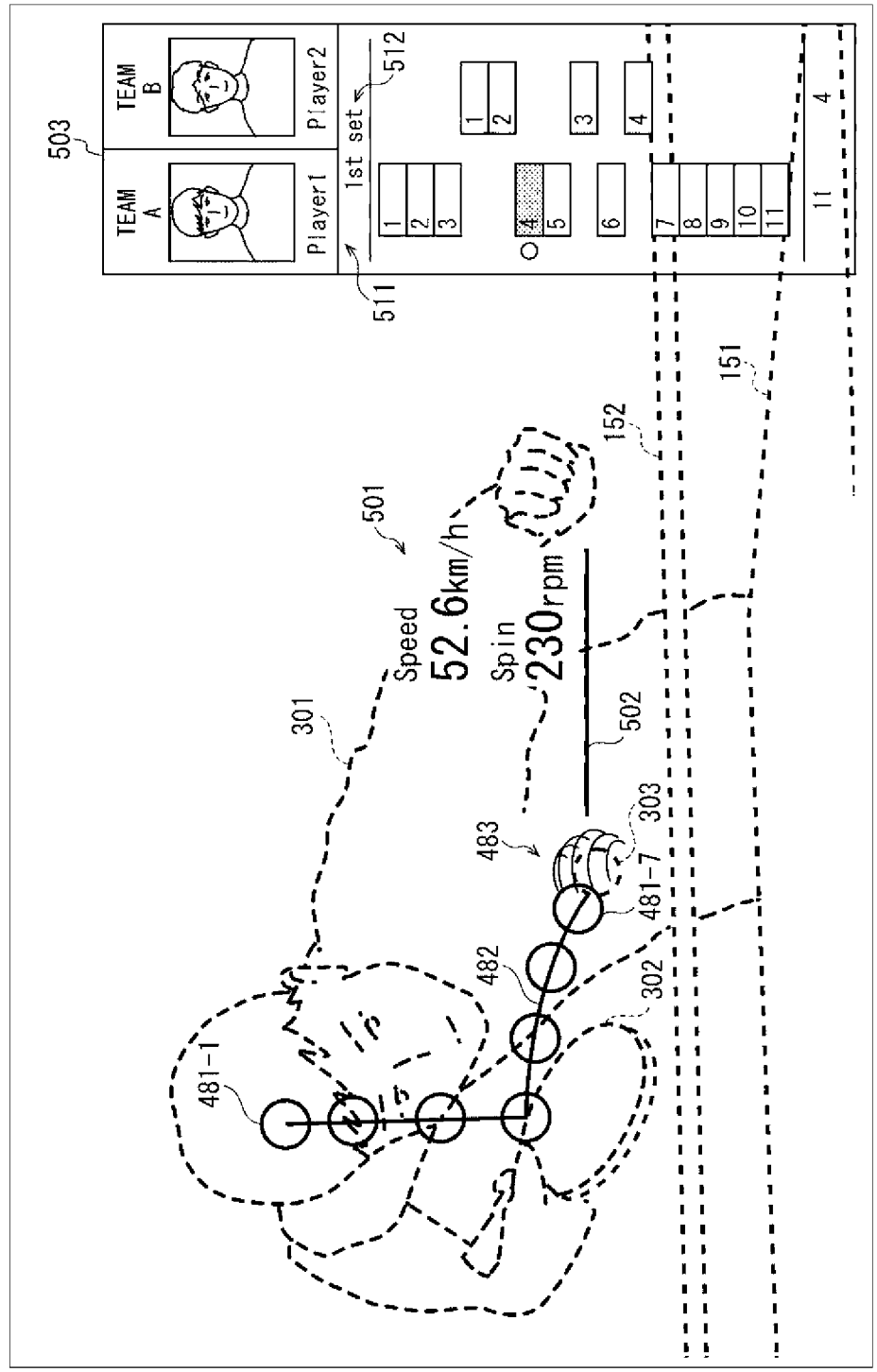
FIG. 15 is a diagram illustrating a tenth example of visual-information-added video.

FIG. 15 illustrates a tenth example of the visual-information-added video. Incidentally, parts corresponding to those in FIG. 14 are denoted by the same reference numerals in the figure, and description thereof will be omitted as appropriate.

The visual-information-added video in FIG. 15 differs from the visual-information-added video in FIG. 14 in that the visual effect 484 and the play information 485 are deleted, and ball information 501, a lead line 502, and game information 503 are added.

The ball information 501 is superimposed near the center of the play video. The ball information 501 includes information regarding the characteristics of the ball 303. Specifically, in the ball information 501, the speed and the spin speed of the ball 303 arranged vertically are displayed.

The lead line 502 associates the ball 303 with the ball information 501 by connecting the two.

The game information 503 includes information regarding the game (set) in which the play being displayed in the play video is performed. In the game information 503, player information 511 and score information 512 arranged vertically are displayed.

The player information 511 includes information related to the players who are playing against each other. Specifically, in the player information 511, pieces of information regarding respective players are displayed side by side. In addition, in the information of each player, the team name, the upper body image, and the player name aligned vertically are displayed.

The score information 512 includes information regarding the score progress and the final score of the game (set) in which the play being displayed in the play video on the left side is performed.

The score progress is displayed by arranging the rectangular boxes containing numbers indicating the scores in the vertical direction in order of each player's scoring time. In this example, the process of scoring is displayed, in which Player 1 first scored the first to third points, then Player 2 scored the first and second points, Player 1 then scored fourth and fifth points, Player 2 scored a third point next, Player 2 then scored a sixth point, Player 2 scored a fourth point next, and Player 1 then scored seventh to eleventh points. Then, the final score of the game is displayed at the lower end of the score information 512.

Also, the color of the box and the circle next to the box displaying the score progress indicate which scene the play video on the left side is displaying. In this example, it is exhibited that the play video on the left side is displaying a scene related to play in the game in which the Player 1 got the fourth point of the first game (first set).

The audience can thereby easily grasp the score progress and can easily recognize which scene in the game the play video is displaying.

Figure 16:
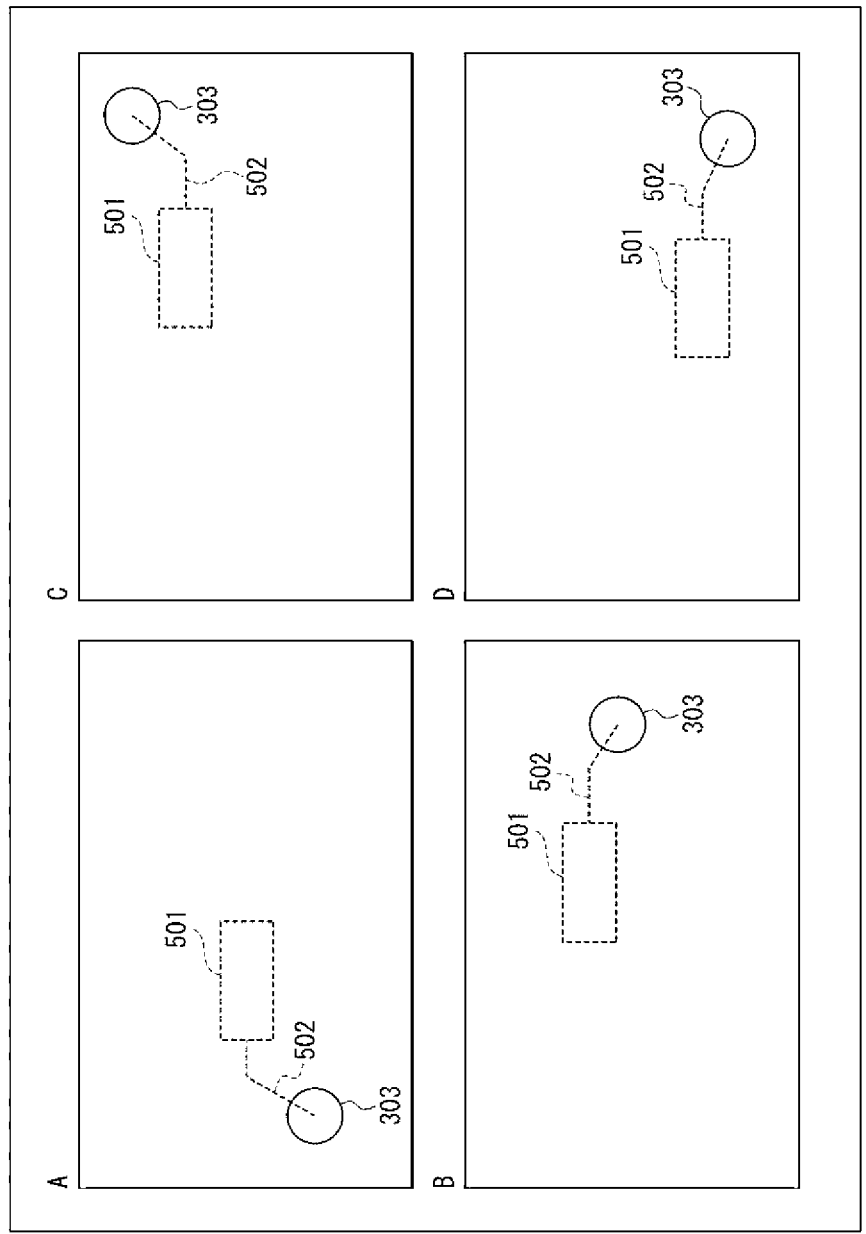
FIG. 16 is a diagram illustrating examples of display positions of ball information.

FIG. 16 illustrates examples of positions where the ball information 501 of FIG. 15 is superimposed (display position) in the play video.

The display position of the ball information 501 changes depending on the position of the ball 303. For example, the ball information 501 is basically displayed at a position closer to the center of the play video image relative to the ball 303, except in the case where the ball 303 is displayed near the center of the play image.

For example, in the example of FIG. 16A, the ball 303 is located near the lower left corner of the play video image. In the example of FIG. 16B, the ball 303 is located at the right end of the play video image and near the center in the vertical direction. In the example of FIG. 16C, the ball 303 is located near the upper right corner of the play video image. In the example of FIG. 16D, the ball 303 is located near the lower right corner of the play video image. In these examples, the ball information 501 is displayed at a position closer to the center of the play video image relative to the ball 303. Further, the ball information 501 is associated with the ball 303 by the lead line 502.

<Eleventh Example of Visual-Information-Added Video>

Figure 17:
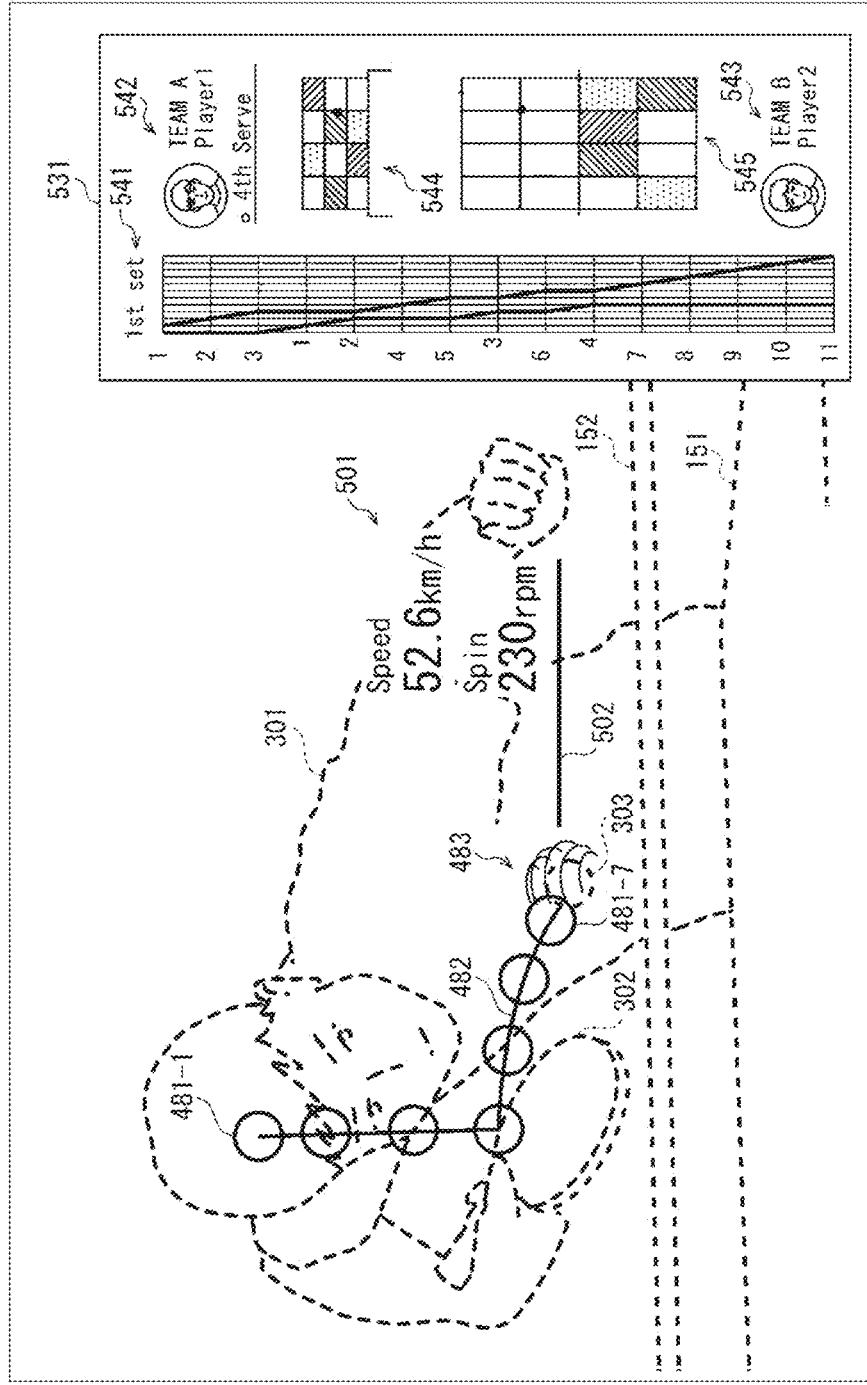
FIG. 17 is a diagram illustrating an eleventh example of visual-information-added video.

FIG. 17 illustrates an eleventh example of the visual-information-added video. Incidentally, parts corresponding to those in FIG. 15 are denoted by the same reference numerals in the figure, and description thereof will be omitted as appropriate.

The visual-information-added video in FIG. 17 differs from the visual-information-added video in FIG. 15 in that game information 531 is superimposed instead of the game information 503.

The game information 531 includes score information 541, player information 542, player information 543, serve information 544, and serve information 545. In the game information 531, the score information 541 is displayed beside the player information 542, the serve information 544, the serve information 545, and the player information 543. Also, the player information 542, the serve information 544, the serve information 545, and the player information 543 arranged vertically are displayed.

The score information 541 includes information regarding the score progress of the game (set) in which the play displayed in play video on the left side is performed. Specifically, the score information 541 indicates the progress of scores of both players in a graph.

The player information 542 includes information regarding one player, and the player information 543 includes information regarding the other player. In the player information 542 and the player information 543, a face photo of each player, a team name, and a player name are displayed respectively.

In addition, in one of the player information 542 and the player information 543, what number of the service belongs to the game whose scene is being displayed in the play video on the left side is indicated. In this example, in the player information 542, it is indicates that the scene is in the game of the fourth service of Player 1.

In the case where the play video on the left side indicates a scene during the game of the service of Player 2, in the player information 543, what number of service of Player 2 belongs to the game being displayed is indicated.

In the serve information 544, the position where the service ball bounces in the opponent's court is indicated by a black circle. In addition, the distribution of the positions where respective service balls in the game bounce in the opponent's court is displayed. Specifically, the opponent's court is divided into areas of 4 columns×3 rows, and the distribution of the positions where the service balls bounce is displayed on an area basis. In addition, the difference in the frequency of the service ball bouncing in each area is represented by the difference in the display mode (for example, colors or patterns) of each area.

In the serve information 545, the position where the service ball bounces in the server's own court is indicated by a black circle. In addition, the distribution of the positions where respective service balls in the game bounce in the opponent's court is exhibited. Specifically, the opponent's court is divided into areas of 4 columns×2 rows, and the distribution of the positions where the service balls bounce is exhibited on an area basis. In addition, the difference in the frequency of the service ball bouncing in each area is represented by the difference in the display mode (for example, colors or patterns) of each area.

The audience can thereby easily grasp the score progress and can recognize which scene in the game the play video is displaying. In addition, the audience can easily understand the tendency of each player's serve.

Note that, for example, the distribution of the positions where the ball 303 bounces in the court in a play other than the serve may be displayed.

<Twelfth Example of Visual-Information-Added Video>

Figure 18:
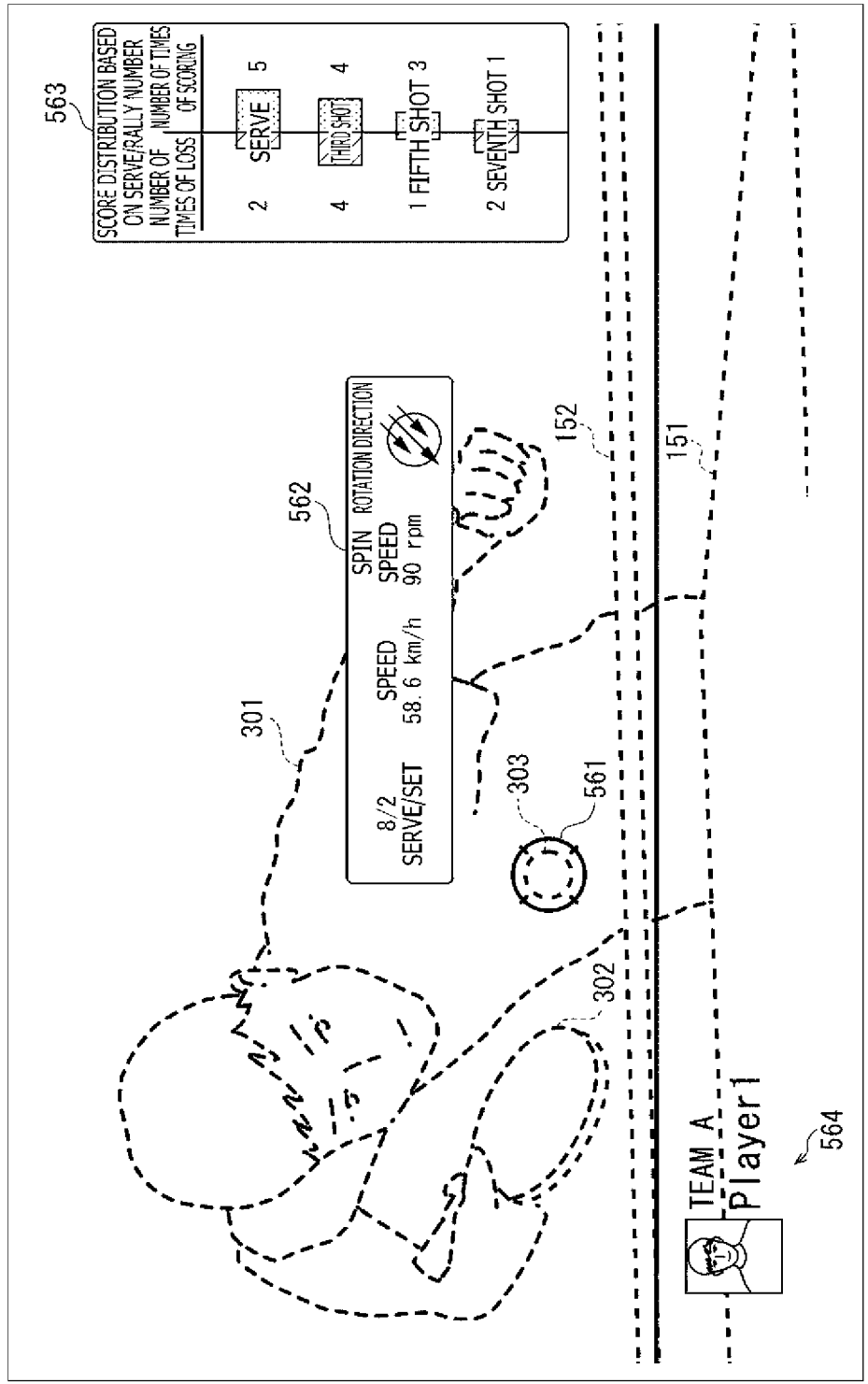
FIG. 18 is a diagram illustrating a modification example of visual information.

FIG. 18 illustrates a twelfth example of the visual-information-added video.

In this example, a visual effect 561, ball information 562, score information 563, and player information 564 are superimposed on the play video.

The visual effect 561 is visual information indicating the position of the ball 303. To be specific, the visual effect 561 surrounds the periphery of the ball 303, and the visual effect 561 allows the audience to easily recognize the position of the ball 303.

The ball information 562 includes information regarding the characteristics of the ball 303. Specifically, in the ball information 562, the speed, the spin speed, and the rotation direction of the ball 303 are displayed side by side. Further, the ball information 562 includes information indicating what game (set) is being displayed in the play video and what number of service belongs to the game being displayed.

The score information 563 includes information regarding the tendency of scored points and lost points of the player 301. To be specific, in the score information 563, the numbers of times of point scoring and point loss in the services, the numbers of times of point scoring and point loss in the second and third shots in rallies, the numbers of times of point scoring and point loss in fourth and fifth shots in rallies, and the numbers of times of point scoring and point loss in the sixth to seventh shots in rallies of the player 301 are exhibited. The audience can thereby understand the tendency of scored points and lost points of the player 301.

The player information 564 includes information regarding the player 301.

Specifically, in the player information 564, an image of the upper body of the player 301 and the profile of the player 301 (the team name and the player name) are displayed side by side.

<Modification Example in Visual Information>

Next, modification examples of visual information will be described with reference to FIGS. 19 to 27.

Figure 19:
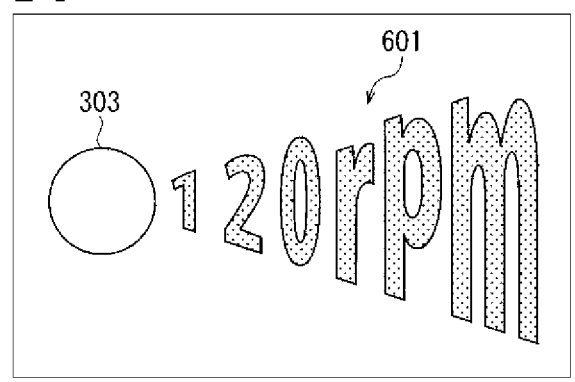
FIG. 19 is a diagram illustrating a modification example of visual information.

FIG. 19 illustrates an example of a visual effect 601 that is visual information indicating the spin speed of the ball 303. The visual effect 601 is superimposed on the right side of the ball 303, and the spin speed of the ball 303 is displayed in 3D with large characters. In this way, displaying the spin speed of the ball 303 with a special design can make the audience pay attention to the spin speed of the ball 303.

Figure 20:
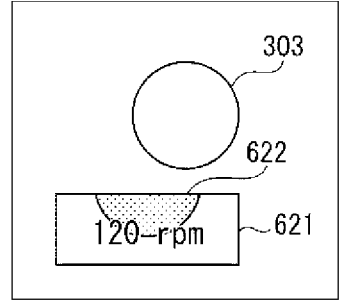
FIG. 20 is a diagram illustrating a modification example of visual information.

FIG. 20 illustrates an example of a visual effect 621 that is visual information indicating the spin speed of the ball 303. The visual effect 621 is superimposed under the ball 303 and displays a spin speed and a CG representing the shadow of the ball 303 in a rectangular frame. In this way, displaying the spin speed of the ball 303 with a special design can make the audience pay attention to the spin speed of the ball 303.

Figure 21:
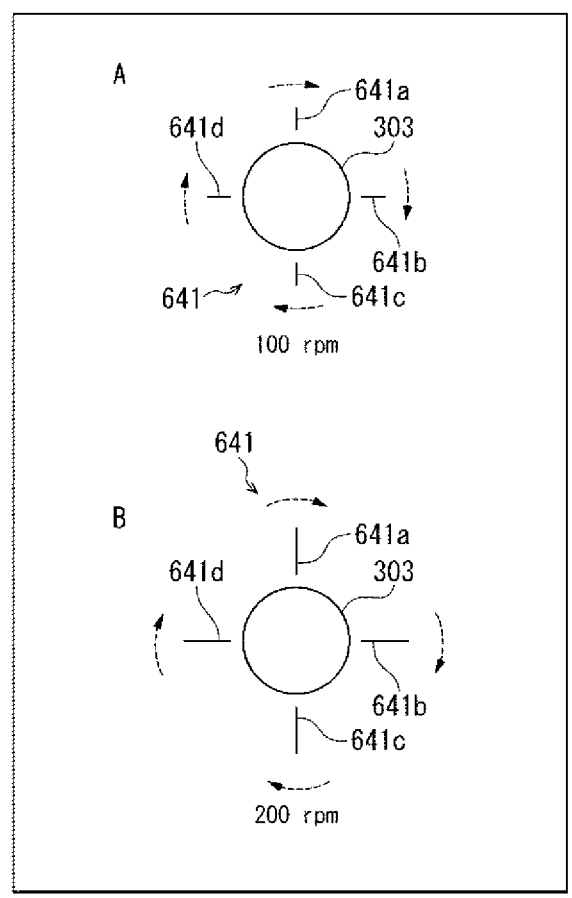
FIG. 21 is a diagram illustrating a modification example of visual information.

FIG. 21 illustrates an example of a visual effect 641 that is visual information indicating the state of rotation of the ball 303. FIG. 21A illustrates an example in the case where the spin speed of the ball 303 is 100 rpm, and FIG. 21B illustrates an example in the case where the spin speed of the ball 303 is 200 rpm. Note that the arrows with broken lines in FIG. 21 indicate the movement of the visual effect 641 and are not actually displayed.

The visual effect 641 includes four bars 641a to 641d arranged at 90-degree intervals so as to surround the ball 303. The bars 641a to 641d are oriented in a direction perpendicular to the outer circumference of the ball 303, and the length changes in accordance with the spin speed of the ball 303. That is, the bars 641a to 641d become longer as the spin speed of the ball 303 increases, and become shorter as the spin speed of the ball 303 decreases. Further, the bars 641a to 641d rotate around the ball 303 in conformance to the rotation direction of the ball 303. The rotation speed of the bars 641a to 641d increases as the spin speed of the ball 303 increases (the rotation speed increases), and decreases as the spin speed of the ball 303 decreases (the rotation speed decreases). In addition, the spin speed is displayed under the ball 303.

Thus, by representing the spin speed of the ball 303 by visual movement, the spin speed of the ball 303 can be effectively communicated to the audience, and can make the audience realize a difference in the spin speeds of the ball 303.

Figure 22:
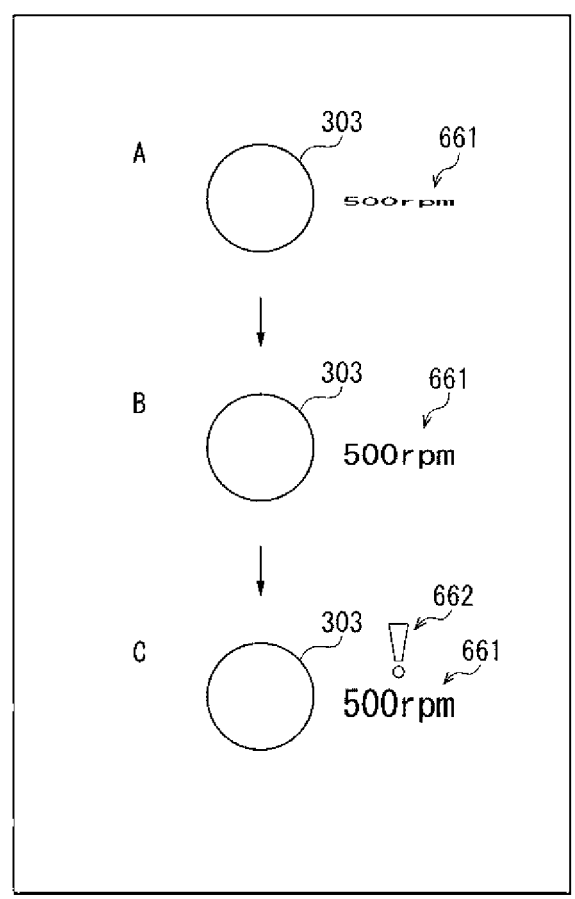
FIG. 22 is a diagram illustrating a modification example of visual information.

FIG. 22 illustrates an example of a visual effect 661 that is visual information indicating the spin speed of the ball 303.

As illustrated in FIGS. 22A to 22C, the visual effect 661 is superimposed on the right side of the ball 303 and rotates at a speed corresponding to the spin speed. Specifically, the visual effect 661 rotates around an axis extending in the horizontal direction in the play video. Further, the speed of rotation of the visual effect 661 increases as the spin speed of the ball 303 increases (the rotation speed increases), and decreases as the spin speed of the ball 303 decreases (the rotation speed decreases).

Further, for example, in the case where the spin speed of the ball 303 is equal to or greater than a predetermined threshold value, when the visual effect 661 faces the front direction, a visual effect 662 representing an exclamation mark is displayed, as illustrated in FIG. 22C.

Thus, by representing the spin speed of the ball 303 by using visual movement, the spin speed of the ball 303 can be effectively communicated to the audience, realizing a difference in the spin speeds of the ball 303.

Figure 23:
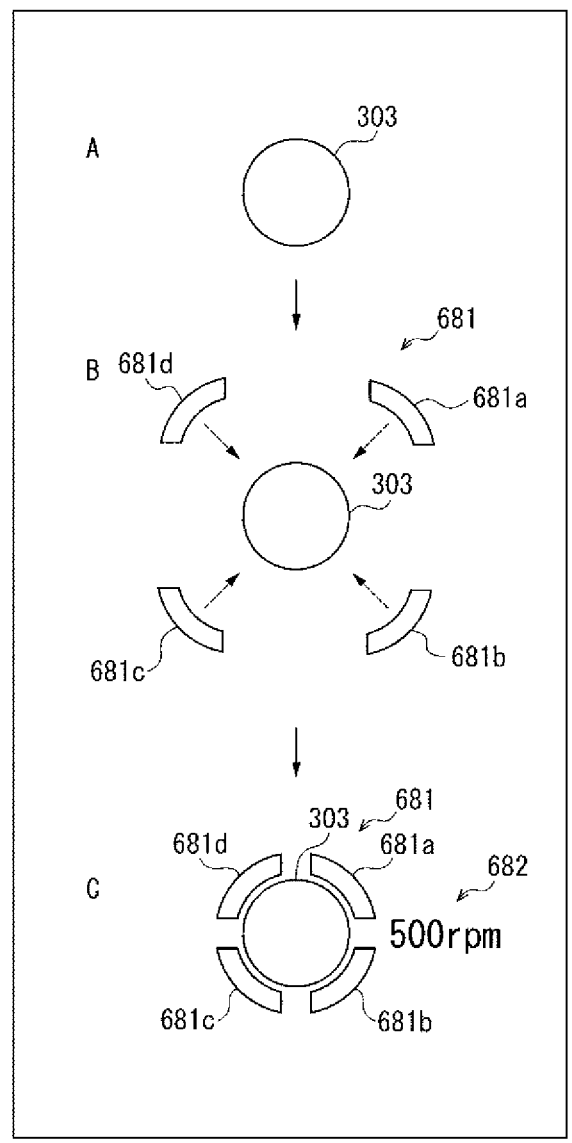
FIG. 23 is a diagram illustrating a modification example of visual information.

FIG. 23 illustrates an example of a visual effect 681 that is visual information indicating the position of the ball 303. Incidentally, in the figure, the arrows with broken lines represent the movement of the visual effect 681 and are not actually displayed.

For example, arcs 681a to 681d constituting the visual effect 681 appear around the ball 303 as illustrated in FIG. 23B from the state in which only the ball 303 is displayed as illustrated in FIG. 23A. The arcs 681a to 681d have a central angle slightly smaller than 90 degrees, and appear simultaneously at positions slightly away from the ball 303 in the upper left, the lower left, the upper right, and the lower right of the ball 303. Thereafter, the arcs 681a to 681d gradually approach the ball 303, and finally stop near the ball 303 and surround the ball 303 as illustrated in FIG. 23C. Further, visual information 682 indicating the spin speed of the ball 303 is displayed on the right side of the ball 303 almost simultaneously with the stop of the arcs 681a to 681d.

The audience can thereby pay attention to the ball 303, and the spin speed of the ball 303 can be reliably communicated to the audience.

Figure 24:
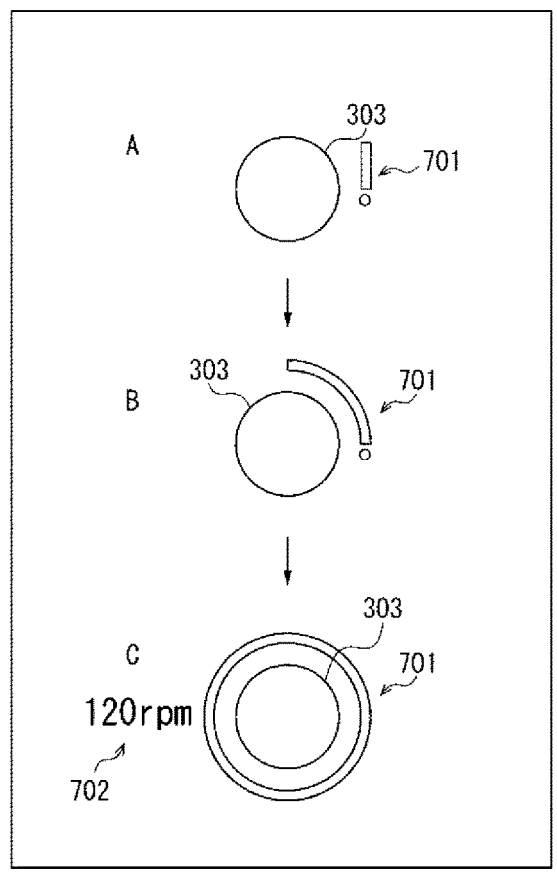
FIG. 24 is a diagram illustrating a modification example of visual information.

FIG. 24 illustrates an example of a visual effect 701 that is visual information indicating the position of the ball 303.

First, as illustrated in FIG. 24A, the visual effect 701 representing an exclamation mark is displayed on the right side of the ball 303. Thereafter, as illustrated in FIG. 24B, the stick part of the exclamation mark of the visual effect 701 extends to surround the ball 303, and finally, the visual effect 701 is transformed into a ring shape surrounding the ball 303 as illustrated in FIG. 24C. In addition, visual information 702 indicating the spin speed of the ball 303 is displayed on the left side of the ball 303 almost simultaneously with the transformation of the visual effect 701 into a ring shape.

The audience can thereby pay attention to the ball 303, and the spin speed of the ball 303 can be reliably communicated to the audience.

Figure 25:
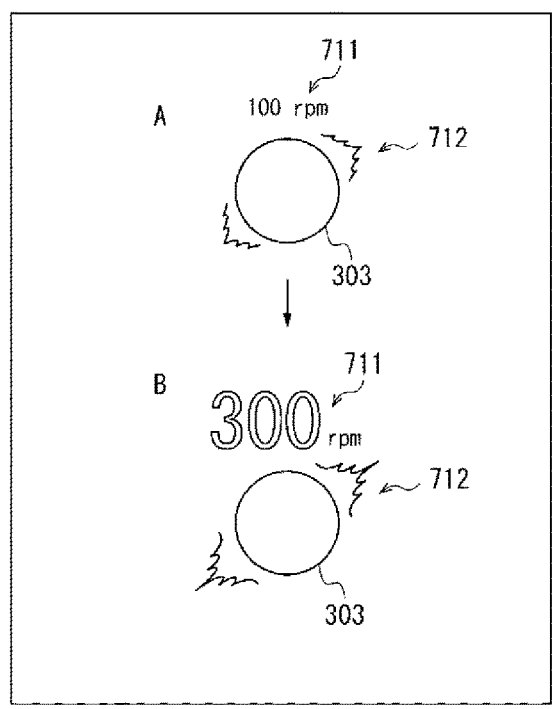
FIG. 25 is a diagram illustrating a modification example of visual information.

FIG. 25 illustrates an example of visual information 711 and a visual effect 712 indicating the spin speed of the ball 303. FIG. 25A illustrates an example in the case where the spin speed of the ball 303 is 100 rpm, and FIG. 25B illustrates an example in the case where the spin speed of the ball 303 is 300 rpm.

The visual information 711 is displayed above the ball 303, and the display mode changes in accordance with the spin speed of the ball 303. Specifically, the character size of the visual information 711 increases as the spin speed of the ball 303 increases, and decreases as the spin speed of the ball 303 decreases.

The visual effect 712 is displayed around the ball 303, and the display mode changes in accordance with the spin speed of the ball 303. Specifically, the size of the visual effect 713 increases as the spin speed of the ball 303 increases, and decreases as the rotation speed of the ball 303 decreases.

The audience can thereby pay attention to the ball 303, and the spin speed of the ball 303 can be reliably communicated to the audience.

Figure 26:
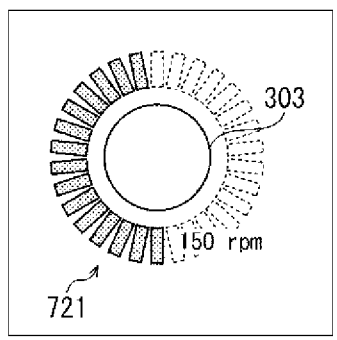
FIG. 26 is a diagram illustrating a modification example of visual information.

FIG. 26 illustrates an example of a visual effect 721 indicating the spin speed of the ball 303.

The visual effect 721 includes a circular meter surrounding the ball 303 and information indicating the spin speed of the ball 303. The meter value increases as the spin speed of the ball 303 increases, and decreases as the spin speed of the ball 303 decreases. The spin speed of the ball 303 is displayed so as to overlap the lower right of the meter.

The audience can thereby pay attention to the ball 303, and the spin speed of the ball 303 can be reliably communicated to the audience.

Moreover, entertainment property is improved by displaying the spin speed of the ball 303 with a meter. For example, a meter is displayed around the ball 303 after the play video temporarily stops to stop the ball 303. Then, the meter value gradually increases in accordance with the spin speed of the ball 303. The degree of the audience's attention with respect to the spin speed can thereby be raised.

Figure 27:
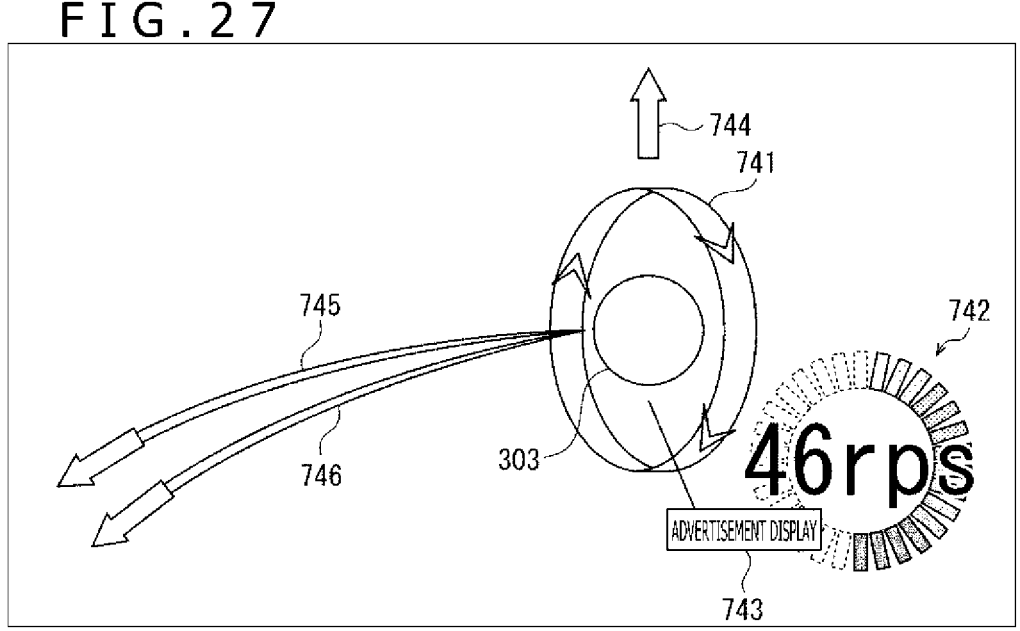
FIG. 27 is a diagram illustrating a modification example of visual information.

FIG. 27 illustrates an example of visual information regarding the rotation and the trajectory of the ball 303. In this example, a visual effect 741, a visual effect 741, an advertisement display 743, and visual effects 744 to 746 are superimposed on the periphery of the ball 303.

The visual effect 741 is displayed so as to surround the ball 303 and rotates in conformance to the rotation direction of the ball 303. Further, the visual effect 741 changes in display mode depending on the spin speed of the ball 303. For example, the color and the speed of rotation of the visual effect 741 change according to the spin speed of the ball.

The visual effect 742 includes a circular meter similar to the visual effect 721 in FIG. 26 and information indicating the spin speed of the ball 303.

In the advertisement display 743, the sponsor name of the table-tennis tournament or the program for broadcasting the edited video, for example, is displayed.

The visual effect 744 represents the direction and magnitude of the force applied to the ball 303 by the spin of the ball 303 by using a vector.

The visual effect 745 indicates the actual trajectory of the ball 303 by an arrow.

The visual effect 746 indicates the estimated trajectory of the ball 303 by using an arrow in the case where the spin of the ball 303 is assumed to be insufficient (in the case where the spin speed is low).

The visual effect 741 and the visual effect 742 can enhance the audience's attention to the rotation direction and the spin speed of the ball 303 and can communicate the rotation direction and the spin speed to the audience in an easily understandable manner. Further, since the audience pays attention to the visual effect 741 and the visual effect 742, the advertisement effect by the advertisement display 743 is enhanced.

In addition, the visual effects 744 to 746 can communicate the effect of the spin of the ball 303 to the audience in an easily understandable manner.

As described above, the contents of table-tennis play can be communicated to the audience in an easily understandable manner.

2. Modification Example

Hereinafter, modification examples of the above-described embodiment of the present technology will be described.

For example, the above-described combinations of visual information are examples, and can be freely changed.

Further, for example, the display position and the display mode (for example, colors or patterns) of the visual information can be freely changed as necessary.

Further, for example, the visual information may be supplied to the server 114 or a subsequent apparatus without being superimposed on the play video, and the visual information may be superimposed on the play video by the server 114 or the subsequent apparatus.

In addition, for example, the display control section 263 may control the display of the edited play video in an external device.

Furthermore, for example, the present technology can be applied to AR (Augmented Reality). For example, a part or all of the information processing apparatus 113 is configured by an eyewear type wearable device. Then, the display control section 263 controls the display device included in the output unit 207 so as to superimpose visual information on the play video and display the video in the field of view of the viewer watching the play video, for example. Thereby, visual information is superimposed on the play video in the viewer's field of view.

Furthermore, the play video on which the visual information is superimposed is not necessary to be a video of actual table-tennis play. For example, a play video in a video game or a play video generated by computer graphics may be used.

3. Others

The series of processes described above can be executed by hardware and can also be executed by software. In the case where the series of processes is executed by software, a program constituting the software is installed in a computer. Here, the computer includes a computer incorporated in dedicated hardware and a general-purpose personal computer capable of executing various functions by installing various programs, for example.

The program executed by the computer can be provided by being recorded on a removable medium (for example, the removable medium 211 in FIG. 3) as a package medium, for example. Further, the program can be provided via a wired or wireless transmission medium such as a local area network, the Internet, or digital satellite broadcasting.

Incidentally, the program executed by the computer may be a program that is processed in the order described in the present specification on a time-series basis, or may be a program for processing in parallel or at a necessary timing such as when a call is made.

In addition, the system means a set of a plurality of components (devices, modules (parts), etc.) in the present specification, and it does not matter whether or not all the components are in the same casing. Accordingly, a plurality of devices housed in separate casings and connected via a network and a single device housing a plurality of modules in one casing are both systems.

Note that the embodiment of the present technology is not limited to the above-described embodiment, and various modifications can be made without departing from the gist of the present technology.

For example, the present technology can employ a configuration of cloud computing in which one function is shared by a plurality of apparatuses via a network and jobs are jointly processed.

In addition, each step described in the above flowchart can be executed by being shared by a plurality of apparatuses in addition to being executed by one apparatus.

Further, in the case where a plurality of processes is included in one step, the plurality of processes included in the one step can be executed by being shared by a plurality of apparatuses in addition to being executed by one apparatus.

<Example of Combination of Configurations>

The present technology can also employ the following configurations.

(1)

An information processing apparatus including:
an image processing section that generates visual information that is to be superimposed on or around a ball in a play video being a video of table-tennis play and that indicates a characteristic of the ball including at least one of a spin speed or a rotation direction of the ball.

(2)

The information processing apparatus according to the above item (1), in which the visual information includes a visual effect indicating the characteristic of the ball on or around the ball.

(3)

The information processing apparatus according to the above item (2), in which the visual effect is displayed differently depending on the characteristic of the ball.

(4)

The information processing apparatus according to the above item (2) or (3), in which the visual effect indicates the characteristic of the ball by a movement.

(5)

The information processing apparatus according to any one of the above items (1) to (4), further including:
an analysis section that estimates at least one of the spin speed or the rotation direction of the ball on the basis of a logo on the ball in the play video.

(6)

The information processing apparatus according to the above item (5), in which the analysis section estimates at least one of the spin speed or the rotation direction of the ball on the basis of a movement of the ball logo between frames of the play video.

(7)

The information processing apparatus according to any one of the above items (1) to (4), further including:
an analysis section that performs an analysis of the play on the basis of the play video, in which
the image processing section extracts a scene to be edited from the play video on the basis of a result of the analysis of the play.

(8)

The information processing apparatus according to any one of the above items (1) to (7), in which
the image processing section superimposes the visual information on the play video.

(9)

The information processing apparatus according to the above item (8), in which the image processing section superimposes the visual information on the play video after stopping the play video such that the characteristic of the ball is displayed on or around the ball stopped in the play video.

(10)

The information processing apparatus according to the above item (8) or (9), further including:
 a display control section that controls display of the play video on which the visual information is superimposed.

(11)

The information processing apparatus according to any one of the above items (1) to (7), further including:
 a display control section that performs control to superimpose the visual information on the play video and display the video in a user's field of view.

(12)

The information processing apparatus according to any one of the above items (1) to (11), in which
 the visual information further indicates a trajectory of the ball.

(13)

The information processing apparatus according to the above item (12), in which the visual information intermittently indicates positions of the ball in the trajectory of the ball.

(14)

The information processing apparatus according to the above item (13), in which the visual information further indicates the characteristic of the ball in at least some of the positions of the ball.

(15)

The information processing apparatus according to any one of the above items (12) to (14), in which
 the visual information indicates the trajectory of the ball by a line.

(16)

The information processing apparatus according to any one of the above items (1) to (15), in which
 the visual information further indicates a position where the ball hits a racket.

(17)

The information processing apparatus according to any one of the above items (1) to (16), in which
 the visual information further indicates a trajectory of a swing.

(18)

The information processing apparatus according to any one of the above items (1) to (17), in which
 the visual information further indicates distribution of positions where the ball bounces within a court.

(19)

A method for processing information for an information processing apparatus, the method including:
 generating visual information that is to be superimposed on or around a ball in a play video being a video of table-tennis play and that indicates a characteristic of the ball including at least one of a spin speed or a rotation direction of the ball.

(20)

A program that causes a computer to execute processing for:
 generating visual information that is to be superimposed on or around a ball in a play video being a video of table-tennis play and that indicates a characteristic of the ball including at least one of a spin speed or a rotation direction of the ball.

In addition, since the effects described in the present specification are only illustrations, the effects of the present technology are not limited thereto, and thus there may exist other effects.

REFERENCE SIGNS LIST

101 Information processing system
111-1 to 111-$m$ Camera
112-1 to 112-$n$ Image sensor
113 Information processing apparatus
114 Server
201 CPU
251 Information processing section
261 Analysis section
262 Image processing section
263 Display control section
264 Communication control section

The invention claimed is:

1. An information processing apparatus, comprising:
 at least one camera configured to capture a play video of a table tennis ball, the play video including a plurality of video frames; and
 processing circuitry configured to
  analyze the plurality of video frames to determine at least one of a spin speed or a rotation direction of the table tennis ball,
  generate visual information including at least one of a numerical value of the determined spin speed or a value indicating the determined rotation direction of the table tennis ball, and
  superimpose and display the visual information, including displaying the generated at least one of the numerical value of the determined spin speed or the value indicating the determined rotation direction of the table tennis ball, on at least one of the plurality of video frames.

2. The information processing apparatus according to claim 1, wherein the visual information includes a visual effect indicating a characteristic of the ball on or around the table tennis ball.

3. The information processing apparatus according to claim 2, wherein the visual effect is displayed differently depending on the characteristic of the table tennis ball.

4. The information processing apparatus according to claim 2, wherein the visual effect indicates the characteristic of the table tennis ball by a movement.

5. The information processing apparatus according to claim 1, wherein the processing circuitry is further configured to determine the at least one of the spin speed or the rotation direction of the table tennis ball based on analysis of a logo on the table tennis ball in the play video.

6. The information processing apparatus according to claim 5, wherein the processing circuitry is further configured to determine the at least one of the spin speed or the rotation direction of the table tennis ball based on analysis of a movement of the logo between the video frames of the play video.

7. The information processing apparatus according to claim 1, wherein the processing circuitry is further configured to perform an analysis of a play based on the play video, and
 the processing circuitry is further configured to extract a scene to be edited from the play video based on a result of the analysis of the play.

8. The information processing apparatus according to claim 1, wherein the processing circuitry is further configured to superimpose the visual information on the play video after stopping the play video such that a characteristic of the table tennis ball is displayed on or around the table tennis ball stopped in the play video.

9. The information processing apparatus according to claim 1, further comprising:
a display controller configured to control display of the play video on which the visual information is superimposed.

10. The information processing apparatus according to claim 1, further comprising:
a display controller configured to perform control to superimpose the visual information on the play video and display the video in a field of view of a user.

11. The information processing apparatus according to claim 1, wherein the visual information further indicates a trajectory of the table tennis ball.

12. The information processing apparatus according to claim 11, wherein the visual information intermittently indicates positions of the table tennis ball in the trajectory of the ball.

13. The information processing apparatus according to claim 12, wherein the visual information further indicates a characteristic of the table tennis ball in at least some of the positions of the table tennis ball.

14. The information processing apparatus according to claim 11, wherein the visual information indicates the trajectory of the table tennis ball by a line.

15. The information processing apparatus according to claim 1, wherein the visual information further indicates a position where the table tennis ball hits a racket.

16. The information processing apparatus according to claim 1, wherein the visual information further indicates a trajectory of a swing.

17. The information processing apparatus according to claim 1, wherein the visual information further indicates a distribution of positions where the table tennis ball bounces within a court.

18. A method for processing information, the method comprising:
capturing, by at least one camera, a play video of a table tennis ball, the play video including a plurality of video frames;
analyzing the plurality of video frames to determine at least one of a spin speed or a rotation direction of the table tennis ball;
generating visual information including at least one of a numerical value of the determined spin speed or a value indicating the determined rotation direction of the table tennis ball, and
superimposing and displaying the visual information, including displaying the generated at least one of the numerical value of the determined spin speed or the value indicating the determined rotation direction of the table tennis ball, on at least one of the plurality of video frames.

19. A non-transitory computer-readable medium storing a program that, when executed, causes a computer to execute a method comprising:
capturing, by at least one camera, a play video of a table tennis ball, the play video including a plurality of video frames;
analyzing the plurality of video frames to determine at least one of a spin speed or a rotation direction of the table tennis ball;
generating visual information including at least one of a numerical value of the determined spin speed or a value indicating the determined rotation direction of the table tennis ball, and
superimposing and displaying the visual information, including displaying the generated at least one of the numerical value of the determined spin speed or the value indicating the determined rotation direction of the table tennis ball, on at least one of the plurality of video frames.

20. The information processing apparatus of claim 1, wherein the processing circuitry is further configured to superimpose and display the numerical value of the determined spin speed on the at least one of the plurality of video frames.

* * * * *